United States Patent
Horn et al.

(10) Patent No.: US 9,713,041 B2
(45) Date of Patent: *Jul. 18, 2017

(54) ACCESS MODE-BASED ACCESS CONTROL

(71) Applicant: QUALCOMM Incorporated, San Diego, CA (US)

(72) Inventors: Gavin Bernard Horn, La Jolla, CA (US); Parag Arun Agashe, San Diego, CA (US); Rajarshi Gupta, Santa Clara, CA (US); Rajat Prakash, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 23 days.

This patent is subject to a terminal disclaimer.

(21) Appl. No.: 14/639,373

(22) Filed: Mar. 5, 2015

(65) Prior Publication Data

US 2015/0181474 A1    Jun. 25, 2015

Related U.S. Application Data

(63) Continuation of application No. 12/771,706, filed on Apr. 30, 2010, now Pat. No. 9,002,356.

(Continued)

(51) Int. Cl.
*H04W 36/00* (2009.01)
*H04W 36/08* (2009.01)
(Continued)

(52) U.S. Cl.
CPC ....... *H04W 36/0038* (2013.01); *H04W 12/08* (2013.01); *H04W 36/08* (2013.01); *H04W 8/20* (2013.01); *H04W 48/08* (2013.01)

(58) Field of Classification Search
CPC ...... H04W 36/30; H04W 36/18; H04W 36/08
(Continued)

(56) References Cited

U.S. PATENT DOCUMENTS 7,873,359 B2    1/2011  Lee et al.
8,954,077 B2 *  2/2015  Horn ............... H04W 36/08
                                                370/331
(Continued)

FOREIGN PATENT DOCUMENTS

CN    101330753 A    12/2008
KR    20060016888 A   2/2006
(Continued)

OTHER PUBLICATIONS

3rd Generation Partnership Project; Technical Specification Group Services and System Aspects; Architecture aspects of Home NodeB and Home eNodeB (Release 9) 3GPP Standard; 3GPP TR 23.830, 3rd Generation Partnership Project (3GPP), Mobile Competence Centre ; 650, Route Des Lucioles ; F-06921 Sophia-Antipolis Cedex ; France, No. V0.4.0, Apr. 1, 2009 (Apr. 1, 2009), pp. 1-53.
(Continued)

*Primary Examiner* — Nghi H Ly

(57) ABSTRACT

Access control for an access point (e.g., a cell of the access point) may be based on an access mode associated with the access point. For example, depending on the access mode, access control may involve performing a membership check for the access point. Such a membership check may be performed at a network entity, a source access point, or some other suitable location in a network. In some aspects, access control may involve performing a membership check for an access point in conjunction with a context fetch procedure. Such a procedure may be performed, for example, when an access terminal arrives at the access point after experiencing RLF at another access point.

46 Claims, 15 Drawing Sheets

Related U.S. Application Data

(60) Provisional application No. 61/175,306, filed on May 4, 2009, provisional application No. 61/175,309, filed on May 4, 2009, provisional application No. 61/229,680, filed on Jul. 29, 2009.

(51) Int. Cl.
*H04W 12/08* (2009.01)
*H04W 8/20* (2009.01)
*H04W 48/08* (2009.01)

(58) Field of Classification Search
USPC ............ 455/436, 442, 435.1, 432.1; 370/331
See application file for complete search history.

(56) References Cited

U.S. PATENT DOCUMENTS

| | | | |
|---|---|---|---|
| 9,002,356 B2* | 4/2015 | Horn | H04W 36/08 370/331 |
| 2007/0183427 A1 | 8/2007 | Nylander et al. | |
| 2008/0261600 A1 | 10/2008 | Somasundaram et al. | |
| 2008/0318576 A1 | 12/2008 | So et al. | |
| 2009/0047960 A1 | 2/2009 | Gunnarsson et al. | |
| 2009/0070694 A1 | 3/2009 | Ore et al. | |
| 2009/0086672 A1 | 4/2009 | Gholmieh et al. | |
| 2009/0092097 A1 | 4/2009 | Nylander et al. | |
| 2009/0093232 A1 | 4/2009 | Gupta et al. | |
| 2010/0124179 A1 | 5/2010 | Lee et al. | |
| 2010/0184454 A1 | 7/2010 | Luft et al. | |
| 2010/0197277 A1 | 8/2010 | Jung et al. | |
| 2010/0210288 A1 | 8/2010 | Kim et al. | |
| 2010/0227611 A1 | 9/2010 | Schmidt et al. | |
| 2010/0278147 A1 | 11/2010 | Horn et al. | |
| 2011/0182202 A1 | 7/2011 | Olofsson et al. | |
| 2011/0281584 A1 | 11/2011 | Sander et al. | |

FOREIGN PATENT DOCUMENTS

| | | |
|---|---|---|
| WO | 2008020698 A1 | 2/2008 |
| WO | WO-2009022976 A1 | 2/2009 |
| WO | WO-2009045969 A2 | 4/2009 |

OTHER PUBLICATIONS

3rd Generation Partnership Project; Technical Specification Group Services and System Aspects; Architecture aspects of Home NodeB and Home eNodeB (Release 9) 3GPP Standard; 3GPP TR 23.830, 3rd Generation Partnership Project (3GPP), Mobile Competence Centre ; 650, Route Des Lucioles ; F-06921 Sophia-Antipolis Cedex ; France, No. VO.4.1, Apr. 1, 2009 (Apr. 1, 2009), pp. 1-53, XP050363905 paragraphs 3.1, 6.3.6.1 to 6.3.7.2.1.1 and 6.3.7.2.2.1 to 6.3.7.2.3.2.1.
3rd Generation Partnership Project; Technical Specification Group Services and System Aspects; General Packet Radio Service (GPRS) enhancements for Evolved Universal Terrestrial Radio Access Network (E-UTRAN) access (Release 9) 3GPP Standard; 3GPP TS 23.401, 3rd Generation Partnership Project (3GPP), Mobile Competence Centre ; 650, Route Des Lucioles ; F-06921 Sophia-Antipolis Cedex ; France, No. V9.4.0, Mar. 25, 2010 (Mar. 25, 2010), pp. 1-258, XP050402066 [retrieved on Mar. 25, 2010] p. 134, line 5 to p. 135, line 25; p. 140, lines 21 to 48; p. 146, line 11 (sub-paragraph 3.) to p. 148, line 4.
3rd Generation Partnership Project; Technical Specification Group Services and System Aspects; Service requirements for Home NodeBs and Home eNodeBs (Release 9), 3GPP TS 22.220 V9.0.0 (Mar. 2009) Table C.1, Parts 5.3.1 and 5.5.4.
Alcatel-Lucent: "Handling of CSG for in-bound Mobility" 3GPP Draft; R3-090745 Inboundmob, 3rd Generation Partnership Project (3GPP), Mobile Competence Centre ; 650, Route Des Lucioles ; F-06921 Sophia-Antipolis Cedex ; France, No. Seoul, Korea; Mar. 18, 2009, Mar. 18, 2009 (Mar. 18, 2009), XP050341132 [retrieved on Mar. 18, 2009] paragraphs 1 to 3.
Huawei: "Discussion of Inbound Handove" 3GPP Draft; R3-090804 Discussion of Inbound Handover_Rev0, 3rd Generation Partnership Project (3GPP), Antipolis Cedex; France, No. Seoul, Korea; Mar. 18, 2009, Mar. 18, 2009 (Mar. 18, 2009), XP050341183 [retrieved on Mar. 18, 2009].
International Search Report and Written Opinion—PCT/US2010/033627, International Search Authority—European Patent Office—Aug. 13, 2010.
Nokia Siemens Networks et al: "Location of CSG access control in active mode" 3GPP Draft; R3-090883, 3rd Generation Partnership Project (3GPP), Mobile Cedex ; France, No. Seoul, Korea; Mar. 18, 2009, Mar. 18, 2009 (Mar. 18, 2009), XP050341252 [retrieved on Mar. 18, 2009] the whole document.
Panasonic: "UE access control in CSG cell " 3GPP Draft; R2-082238 UE Access Control in CSG Cell, 3rd Generation Partnership Project (3GPP), Mobile Cedex ; France, vol. RAN WG2, No. Kansas City, USA; Apr. 29, 2008, Apr. 29, 2008 (Apr. 29, 2008), XP050140005 [retrieved on Apr. 29, 2008] paragraphs 1. to 2.3.
Qualcomm Europe: "Access control for in-bound handover to a CSG cell" 3GPP Draft; R3-091025, SRD Generation Partnership Project (3GPP), Mobile Competence Centre ; 650, Route Des Lucioles ; F-06921 Sophia-Antipolis Cedex; France, No. San Francisco, USA; Apr. 29, 2009, Apr. 29, 2009 (Apr. 29, 2009), XP050341410 [retrieved on Apr. 29, 2009] paragraphs 1 to 5.
QUALCOMM Europe: "Access Stratum based 24,37, solution to connection recovery after RLF" 39,40, 3GPP Draft; R3-090701, 3rd Generation 44,45, Partnership Project (3GPP), Mobile 49,50, Competence Centre ; 650, Route Des 54,55, Lucioles ; F-06921 Sophia-Antipolis Cedex 57,58, ; France, No. Seoul Korea; Mar. 18, 2009, 62,63, Mar. 18, 2009 (Mar. 18, 2009), XP050341088 65,66, [retrieved on Mar. 18, 2009] 68,69 paragraphs 1. to 3.
Taiwan Search Report—TW099114268—TIPO—Nov. 1, 2013.
Vodafone: "Definition of CSG cell to Include Hybrid Access Mode" 3GPP Draft; R2-092123, 3rd Generation Partnership Project (3GPP), Mobile Competence ; 650, Route Des Lucioles ; F-06921 Sophia-Antipolis Cedex ; France, No. Seoul, Korea; Mar. 16, 2009, Mar. 16, 2009 (Mar. 16, 2009), XP050339967 [retrieved on Mar. 16, 2009] paragraphs 1 to 3.
Taiwan Search Report—TW102122202—TIPO—Mar. 6, 2015.
Ericsson: "QoS principles in Hybrid access cell", 3GPP Draft; R3-090832, 3rd Generation Partnership Project (3GPP), Mobile Competence Centre; 650, Route Des Lucioles; F-06921 Sophia-Antipolis Cedex; France, No. Seoul, Korea; Mar. 18, 2009, Mar. 18, 2009 (Mar. 18, 2009), pp. 1-2, XP050341209.
Huawei: "Discussion of Inbound Handover, R3-090932," 3GPP TSG-RAN WG3#63, Mar. 26, 2009.
Huawei: "Discussion on Admission Control, R3-091090," 3GPP TSG-RAN WG3#64, Apr. 29, 2009.
QUALCOMM Europe: "Access Control for in-bound Mobility to HeNBs", 3GPP TSG-SA WG2#70, TD S2-090792, Jan. 16, 2009, 5 Pages.

\* cited by examiner

ACCESS MODE-BASED ACCESS CONTROL

CROSS REFERENCES

This is a continuation application of U.S. application Ser. No. 12/771,706, entitled "ACCESS MODE-BASED ACCESS CONTROL" filed Apr. 30, 2010, which claims priority to Provisional Application No. 61/175,306, entitled "ACCESS CONTROL FOR IN-BOUND HANDOVER TO A CLOSED SUBSCRIBER GROUP (CSG) CELL" filed May 4, 2009, Provisional Application No. 61/175,309, entitled "CLOSED SUBSCRIBER GROUP (CSG) ACCESS CONTROL FOR LONG TERM EVOLUTION USER EQUIPMENT" filed May 4, 2009, and Provisional Application No. 61/229,680, entitled "ACCESS CONTROL AND QUALITY OF SERVICE SUPPORT FOR IN-BOUND MOBILITY" filed Jul. 29, 2009, all of which are assigned to the assignee hereof and the entirety of which is hereby expressly incorporated by reference herein.

BACKGROUND

Field

This application relates generally to communication and more specifically, but not exclusively, to access control.

Introduction

A wireless communication network may be deployed over a defined geographical area to provide various types of services (e.g., voice, data, multimedia services, etc.) to users within that geographical area. In a typical implementation, access points (e.g., corresponding to different cells) are distributed throughout a network to provide wireless connectivity for access terminals (e.g., cell phones) that are operating within the geographical area served by the network.

In general, at a given point in time, the access terminal will be served by a given one of these access points. As the access terminal roams throughout this geographical area, the access terminal may move away from its serving access point and move closer to another access point. In addition, signal conditions within a given cell may change, whereby an access terminal may be better served by another access point. In these cases, to maintain mobility for the access terminal, the access terminal may be handed-over from its serving access point to the other access point.

As the demand for high-rate and multimedia data services rapidly grows, there lies a challenge to implement efficient and robust communication systems with enhanced performance. To supplement conventional network access points (e.g., macro access points), small-coverage access points may be deployed (e.g., installed in a user's home) to provide more robust indoor wireless coverage or other coverage to mobile units. Such small-coverage access points may be referred to as, for example, femto access points, femto cells, home NodeBs, home eNodeBs, or access point base stations. Typically, such small-coverage base stations are connected to the Internet and the mobile operator's network via a DSL router or a cable modem.

A small-coverage access point may support restricted access. For example, access at a given access point may be restricted to those access terminals that are a member of a defined group (e.g., the set of access terminals belonging to the owner of the access point). In some cases, an access point may provide different levels of service to different access points. For example, a so-called hybrid access point may provide one level of service (e.g., preferred service) for member access terminals and a different level of service for non-member access terminals. In view of the above, there is a need for effective access control for these and other types of access points that support restricted access.

SUMMARY

A summary of sample aspects of the disclosure follows. In the discussion herein, any reference to the term aspects may refer to one or more aspects of the disclosure.

The disclosure relates in some aspects to providing access control for an access point (e.g., a cell of the access point) based on an access mode associated with the access point (e.g., associated with a cell of the access point). For example, a closed access mode may indicate that the cell is only accessible by a small group of users/mobiles. Or an access mode may indicate whether a cell is a hybrid cell that provides different levels of service for member access terminals than it provides for non-member access terminals.

Depending on the access mode, in some aspects access control may involve performing a membership check for the cell. Such a membership check may be performed, for example, at a network entity (e.g., a mobility manager) or at a source access point (e.g., at a cell of an access point that is currently serving the access terminal).

As an example of a membership check at a network entity, upon receiving a message requesting handover of an access terminal to a target cell, the network entity may determine whether the access terminal is a member of a subscriber group (e.g., a closed subscriber group) associated with the target cell. The network entity may then send a handover message to the target cell, where the message includes an indication of whether the access terminal is a member of the subscriber group.

In some aspects, a source access point (e.g., a source cell) may provide access mode information that is used for a membership check. For example, the source access point may determine an access mode of a target cell and then send a message to initiate handover of an access terminal to the target cell. Here, the message may include an indication of the access mode.

As an example of a membership check at a source access point, the source access point may determine whether an access terminal is a member of a subscriber group associated with a target cell. The source access point may then send a message to initiate handover of the access terminal, where the message includes an indication of whether the access terminal is a member of the subscriber group.

The disclosure relates in some aspects to performing a membership check after an access terminal experiences radio link failure (RLF). For example, when a cell receives a request from an access terminal to establish a connection at the cell (e.g. due to the access terminal experiencing RLF at a source cell), the cell may determine that context information of the access terminal is needed. Consequently, the cell may send a message requesting the context information. Upon receipt of this message, a network entity may determine whether the access terminal is a member of a subscriber group associated with the cell. If so, the network entity may send a message to the source cell requesting the context information.

BRIEF DESCRIPTION OF THE DRAWINGS

These and other sample aspects of the disclosure will be described in the detailed description and the appended claims that follow, and in the accompanying drawings, wherein:

Figure 1:
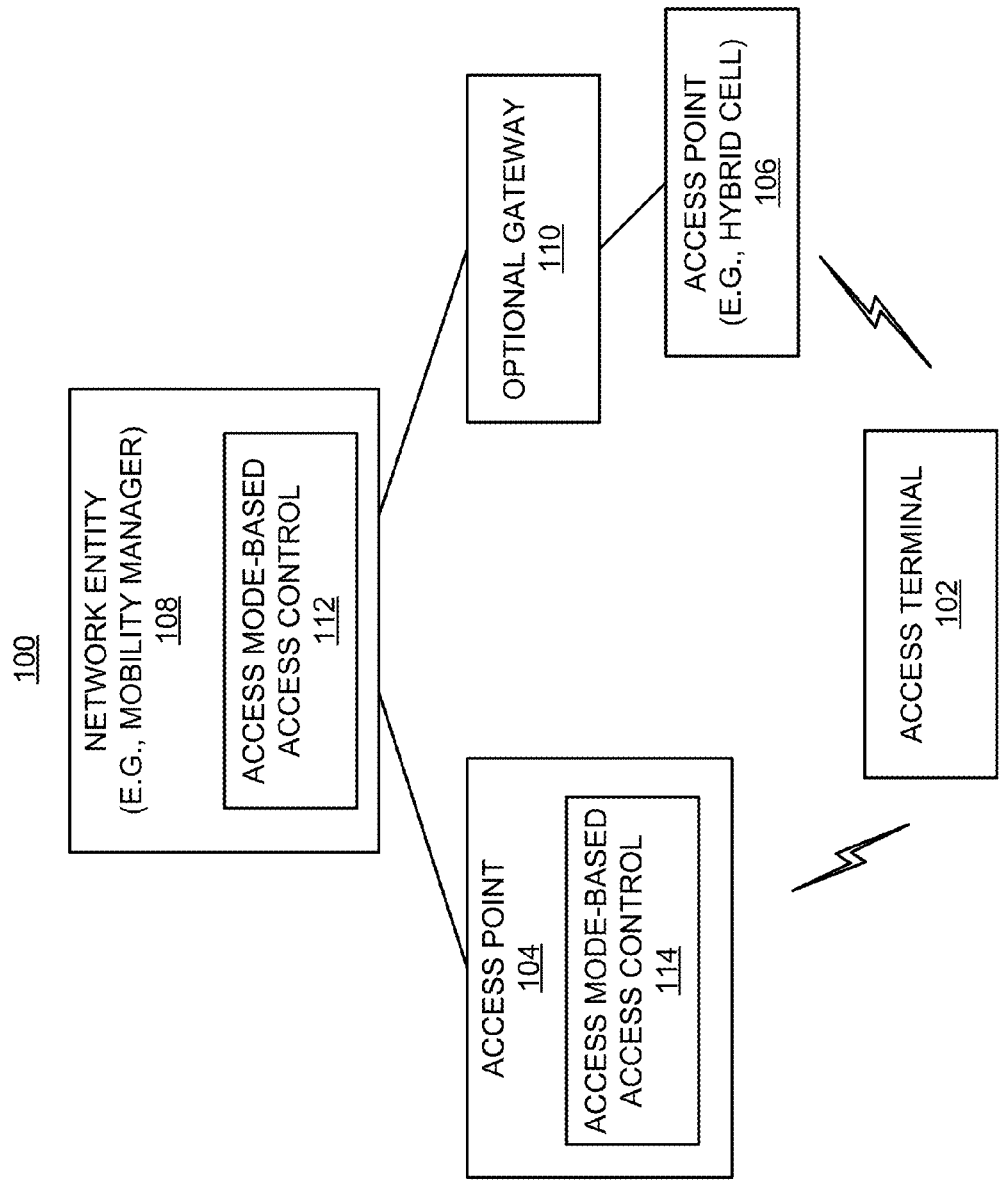
FIG. 1 is a simplified block diagram of several sample aspects of a communication system adapted to provide access mode-based access control.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates several nodes of a sample communication system 100 (e.g., a portion of a communication network). For illustration purposes, various aspects of the disclosure will be described in the context of one or more access terminals, access points, and network entities that communicate with one another. It should be appreciated, however, that the teachings herein may be applicable to other types of apparatuses or other similar apparatuses that are referenced using other terminology. For example, in various implementations access points may be referred to or implemented as base stations, NodeBs, eNodeBs, Home NodeBs, Nome eNodeBs, cells, and so on, while access terminals may be referred to or implemented as user equipment, mobiles, and so on.

Access points in the system 100 provide one or more services (e.g., network connectivity) for one or more wireless terminals (e.g., access terminal 102) that may be installed within or that may roam throughout a coverage area of the system 100. For example, at various points in time the access terminal 102 may connect to an access point 104, an access point 106, or some other access point in the system 100 (not shown). Each of the access points may communicate with one or more network entities (represented, for convenience, by network entity 108) to facilitate wide area network connectivity. In some implementations, one or more access points (e.g., home NodeBs or home eNodeBs) may communicate with a network entity via an optional gateway 110.

A network entity may take various forms such as, for example, one or more radio and/or core network entities. Thus, in various implementations the network entity may represent functionality such as at least one of: network management (e.g., via an operations, administration, and maintenance (OAM) entity), call control, session management, mobility management, gateway functions, interworking functions, or some other suitable network functionality. In some aspects, mobility management relates to: keeping track of the current location of access terminals through the use of tracking areas, location areas, routing areas, or some other suitable technique; controlling paging for the access terminals; and providing access control for access terminals. Also, two of more of these network entities may be co-located or distributed within the network.

In accordance with the teachings herein, access control for an access point (e.g., a cell of the access point) may be based on an access mode associated with the access point (or cell). For example, for certain types of access modes, the network may perform a membership check to determine whether an access terminal to be handed-off to a target cell is a member of a group (e.g., a subscriber group such as a closed subscriber group (CSG)) associated with the target cell. In this case, the network may inform the target cell (e.g., via a CSG membership indication) whether the access terminal is a member.

For a target cell that is a hybrid cell, the target may use the CSG membership indication to determine whether to admit the access terminal or to determine how to allocate resources for the access terminal and/or another access terminal. For example, if the access terminal is a member, the target may decide to admit the access terminal and also decide whether it is necessary to handover another access terminal that it is serving that is not a member of the CSG if there are insufficient resources to serve both access terminals. The target may decide to handover the non-member access terminal before or after the handover of the member access terminal actually occurs. As another example, if the access terminal is not a member, the target may decide not to admit the access terminal if there are insufficient resources to serve the access terminal based on the quality of service (QoS) requirements of the bearers assigned to the access terminal.

Access control may be performed by various components of the network. For example, in some implementations the network entity (e.g., a mobility manager) may provide this access control (e.g., via an access mode-based access control component 112). In some implementations an access point may provide this access control (e.g., via an access mode-based access control component 114).

Sample access control operations will be described in more detail in conjunction with the flowcharts of FIGS. 2-7. For convenience, the operations of FIGS. 2-7 (or any other operations discussed or taught herein) may be described as being performed by specific components (e.g., components as shown in FIGS. 1 and 8). It should be appreciated, however, that these operations may be performed by other types of components and may be performed using a different number of components. It also should be appreciated that one or more of the operations described herein may not be employed in a given implementation.

Figure 2:
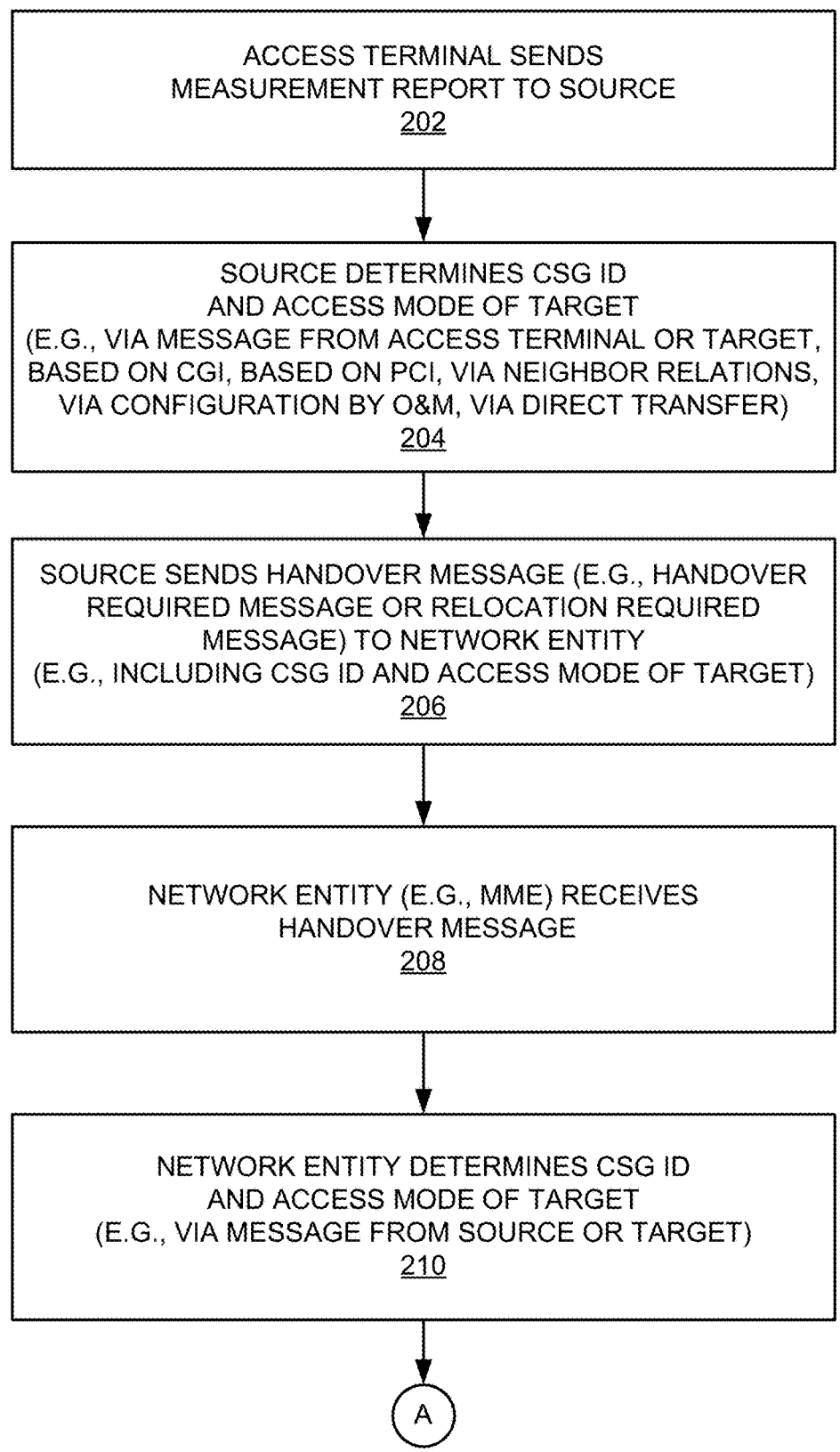
FIGS. 2 and 3 are a flowchart of several sample aspects of operations that may be performed in conjunction with providing a membership check at a network entity.
Figure 3:
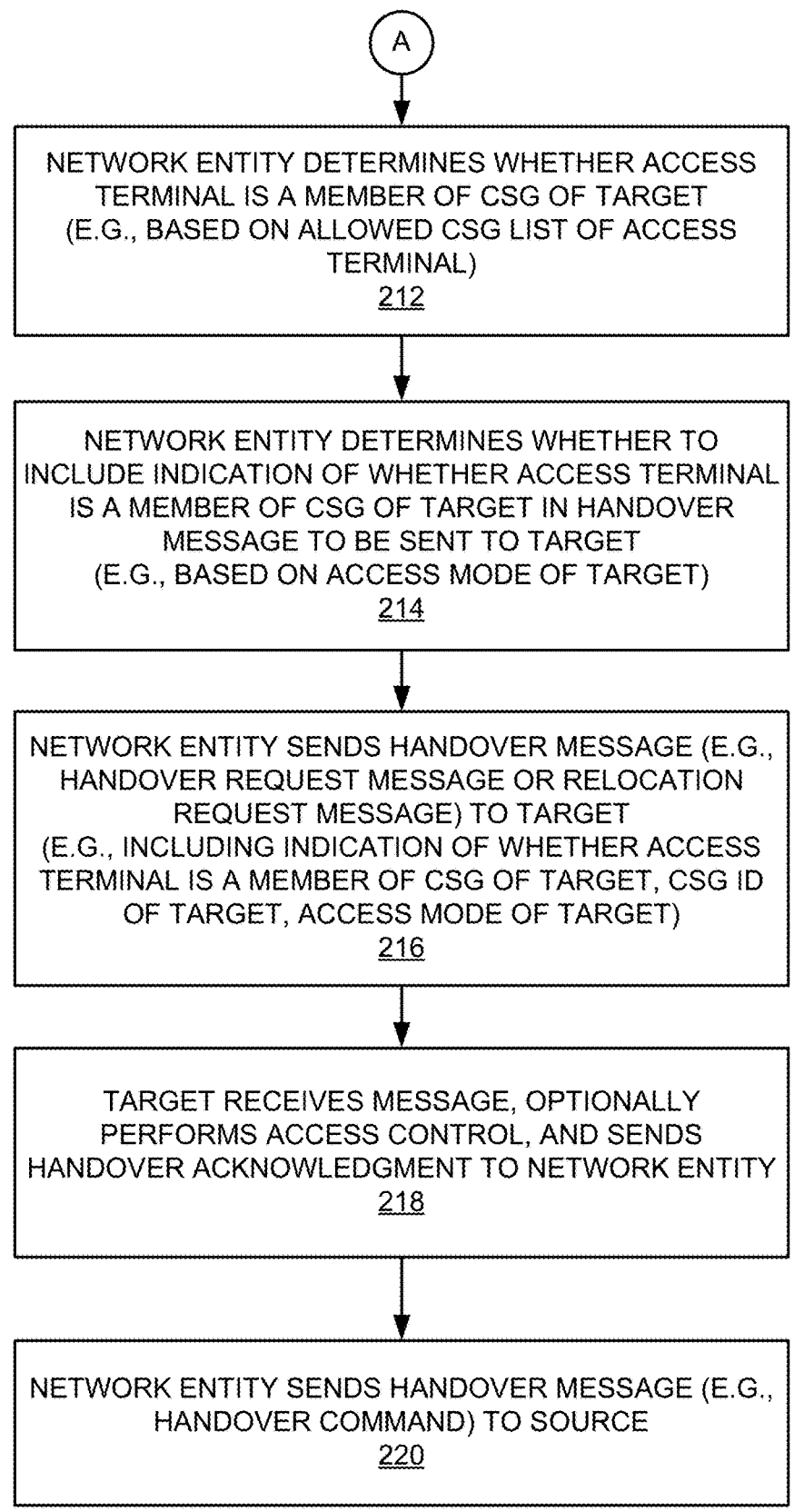

The flowchart of FIGS. 2 and 3 illustrates operations that may be performed in conjunction with a network entity (e.g., a mobility manager) performing access control as taught herein. For access control performed at a mobility manager, the mobility manager may need to determine the CSG ID and access mode associated with the CGI of the target. For example, the mobility manager may not have knowledge of the CSG ID and access mode associated with the target if a gateway (e.g., a HeNB gateway) is deployed. As discussed herein, this information may be provided to the mobility manager by the source or the target during the handover procedure.

Such a network entity may take various forms. For example, in an LTE system a mobility manager may comprise a mobility management entity (MME). In a UMTS system, a mobility manager may comprise a serving GPRS support node (SGSN) and/or a mobile switching center/visitor location register (MSC/VLR).

For purposes of illustration, the discussion that follows may refer to an access terminal as being handed-over from a source to a target. It should be appreciated that the source and target may comprise access points, cells, sectors, or some outer suitable entities.

An access terminal may regularly perform radio frequency ("RF") measurements and determine that the signals being received from a neighbor cell (e.g., a prospective target) are stronger than the signals being received from the current serving cell by a certain margin. Thus, as represented by block 202 of FIG. 2, the access terminal may send a measurement report including the measurement information to the network (e.g., to its serving cell—the source cell for the handover) so that the network may decide whether the access terminal should be handed-over to the target.

In general, the access terminal is able to acquire certain information about the target from broadcast signals received from the target. For example, the access terminal may be able to determine one or more identifiers of the target (e.g., a physical cell identifier (PCI) and a cell global identifier (CGI)), an identifier of a CSG (CSG ID) associated with the target, and an access mode of the target. Accordingly, in some implementations, the access terminal may include some or all of this information in the measurement report.

Also, in some cases (e.g., when the access mode indicates that the target is a closed cell) the access terminal may compare the CSG ID of the target to the CSG IDs in the access terminal's CSG list (e.g., an allowed CSG list) to determine whether the access terminal is allowed to access the target. In such a case, the measurement report also may include an indication of whether the access terminal is allowed to access the target (e.g., an indication of whether the access terminal is a member of a CSG of the target).

As represented by block 204, at some point in time the source determines the CSG ID and the access mode of the target. In some implementations, the source may receive this information via a message (e.g., the measurement report) from the access terminal. However, the access terminal may not report this information (or even the CGI of the target) in other implementations. Accordingly, the source may acquire this information in other ways in various implementations as discussed below.

The source may receive the CSG ID and access mode information via a message from the target. For example, the target may send this information to the source during a handover operation.

The source may determine the CSG ID and access mode information based on the PCI of the target. For example, the source may use a look-up table (e.g., maintained at the source) that maps the PCI to a CSG ID and access mode). As another example, the source may use information about PCI ranges assigned to hybrid cells and closed cells to determine the access mode of the target.

The source may determine the CSG ID and access mode information based on the CGI of the target. For example, the source may use a look-up table (e.g., maintained at the source) that maps the CGI to a CSG ID and access mode. In some cases, the source receives the CGI of the target from the access terminal (e.g., via the measurement report). In cases where this is not possible, the source may receive the CGI from an OAM entity, the source may determine the CGI based on the PCI, or the source may acquire the CGI in some other manner.

The source may determine the CSG ID and access mode information via neighbor relations. For example, the source may communicate with neighboring cells to learn this information. As a specific example, CSG ID and access mode may be added as a field of neighbor discovery during automatic neighbor relations (ANR) over an X2 interface in LTE.

The source may determine the CSG ID and access mode information via configuration by an OAM entity. For example, CSG ID and access mode may be added to a neighbor relation configured by an OAM.

The source may determine the CSG ID and access mode information via a direct transfer. Here, the source may query the target for the information and the target may respond to the query with the information. For example, discovery of CSG ID and access mode may be supported over an LTE S1 eNodeB/MME Direct Transfer, in a similar manner as Internet protocol (IP) address discovery is supported.

As represented by block 206, the source may then initiate handover (e.g., if the access terminal indicates that it is allowed to access the target). Here, the source sends a handover message which is received at the network entity (e.g., MME) as represented by block 208. This handover message may include, for example, the CSG ID, access mode, and CGI of the target.

The handover message may take various forms in different implementations. For example, in an LTE system the source may send a Handover Required message to the MME, while in a UMTS system the source may send a Relocation Required message to the MSC/SGSN.

As represented by block 210, the network entity determines the CSG ID and the access mode of the target. In some implementations, the network entity may receive this information via a message (e.g., the handover message) from the source. In other implementations, the network entity may acquire this information via a message from the target (e.g., during handover operations), or in some other manner.

Based on this target information and a CSG list (e.g., an allowed CSG list) of the access terminal, the network entity may perform access control for the handover. For example, as represented by block 212 of FIG. 3, the network entity may determine whether the access terminal is a member of a CSG associated with the target.

In the event the access mode indicates that the target has closed access (e.g., the target is not a hybrid cell or open cell) and it is determined that the access terminal is not allowed to access the target (e.g., the access terminal did not have the latest allowed CSG list and, hence, incorrectly indicated that it was allowed access), the network entity may send a failure message back to the source. This failure message (e.g., a handover preparation failure message) may include, for example, an error code that indicates that the access terminal is not allowed at the CSG.

As represented by block 214, the network entity also determines whether to include an indication of whether the access terminal is a member of the CSG of the target in a handover message to be sent to the target. For example, in the event the access mode indicates that the target is a hybrid cell, the network entity will include this indication in the message. In this way, the target may determine whether the access terminal is a member or non-member of the CSG for the handover decision. In contrast, if the access mode indicates that the target has closed access (e.g., where the handover message is sent only if access is allowed), the network entity may elect to not include such an indication in the handover message.

As represented by block 216, the network entity then sends the handover message to the target. This handover message may include, for example, the CSG ID, access mode, and CGI of the target. For example, in a case where the source obtains the CSG ID and the access mode from an access terminal, it may be desirable to confirm the CSG ID and the access mode to ensure that a rogue access terminal is not reporting this information incorrectly. One way to do this is for the network entity to include the CSG ID and the access mode in the handover message sent to the target and for the target to check that this is in fact the CSG ID and access mode that the target is advertising.

The handover message sent at block 216 may take various forms in different implementations. For example, in an LTE system the network entity may send a Handover Request message to the target, while in a UMTS system the source may send a Relocation Request message to the MSC/SGSN. Also, in cases there the target is accessed via a gateway (e.g., a Home eNodeB gateway) the handover message is sent to the target via the gateway.

As represented by block 218, upon receipt of this message, the target may perform access control for the handover. For example, the target may confirm that the CSG ID and the access mode are correct. If the target is a hybrid cell, the target cell may use the indication of whether the access terminal is a member of the CSG in determining whether to accept the handover and/or how to allocate resources (e.g., QoS).

The target may then send a handover acknowledgement message (e.g., a handover request acknowledgement message or a relocation request acknowledgement message) to the network entity. In some implementations, the handover acknowledgement message may include the CSG ID and access mode of the target. In this way, the network entity may perform the access control (e.g., membership check) upon receipt of this message (e.g., rather than at block 212).

As represented by block 220, upon receipt of the handover acknowledgement message, the network entity may send a handover message (e.g., a handover command or a relocation command) to the source. The handover of the access terminal to the target may then be completed.

Figure 4:
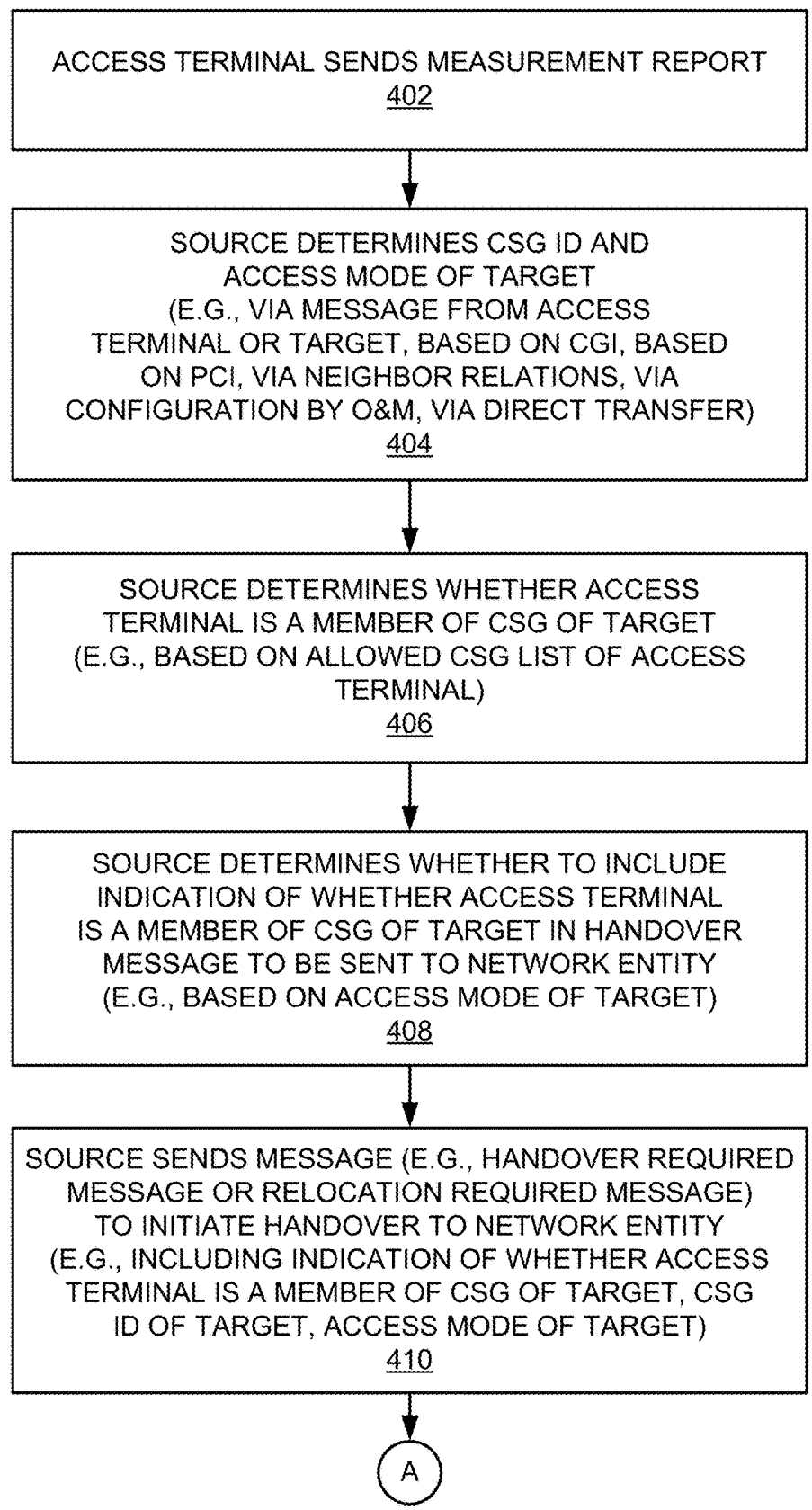
FIGS. 4 and 5 are a flowchart of several sample aspects of operations that may be performed in conjunction with providing a membership check at an access point.
Figure 5:
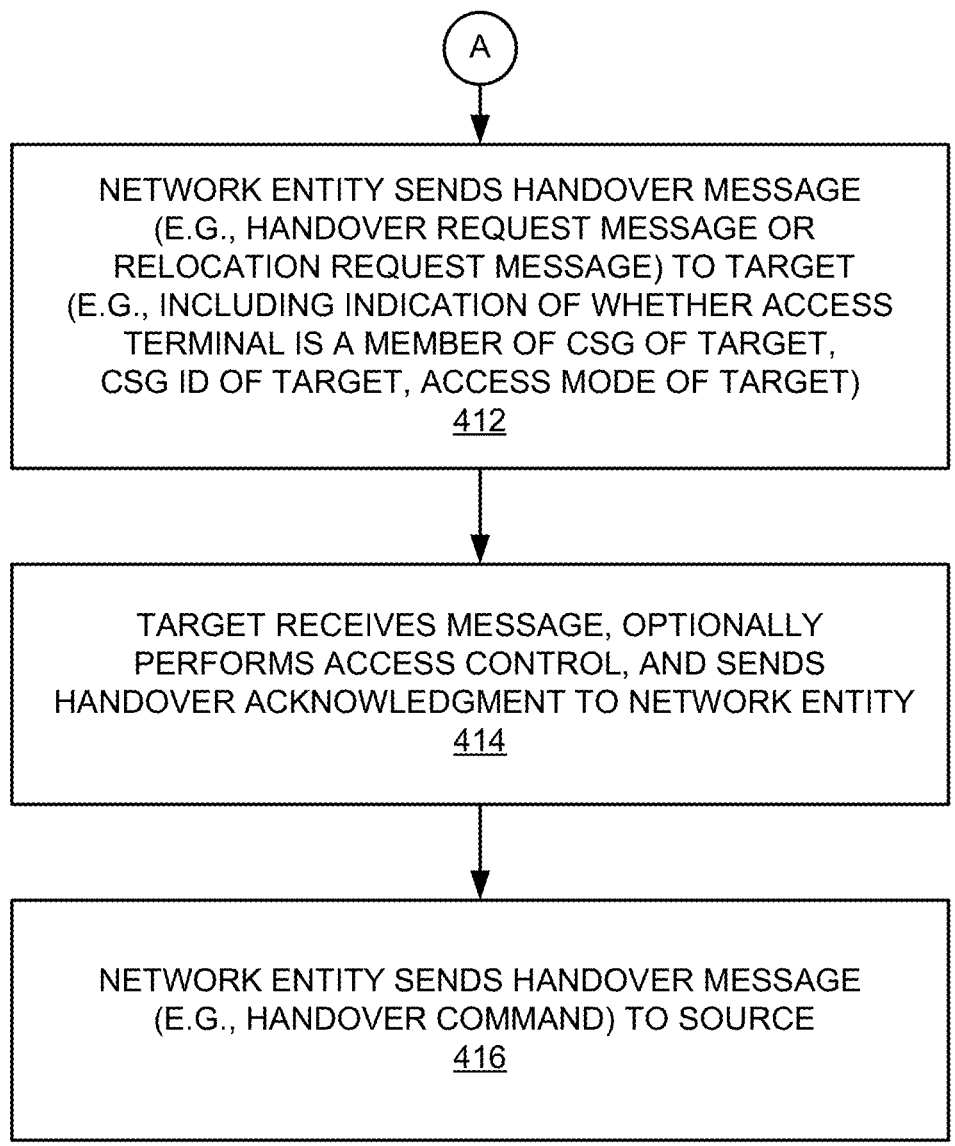

The flowchart of FIGS. 4 and 5 illustrates operations that may be performed in conjunction with a source access point performing access control as taught herein. Such an access point may take various forms. For example, in an LTE system an access point may be referred to as an eNodeB, a Home eNodeB, and so on. In a UMTS system, an access point may be referred to as a NodeB, a Home NodeB, and so on.

For access control performed at a source, the source may need to determine the CSG ID and access mode associated with the CGI of the target, as well as the CSG list (e.g., allowed CSG list) of the access terminal. The source may acquire the CSG ID and access mode, for example, as discussed above in conjunction with block 204. The source may acquire the CSG list of the access terminal in various ways. For example, the CSG list may be included in a Handover Restriction List (in a case of handover over an S1 interface), in a Handover Request (in the case of handover over an X2 interface), or in some other suitable manner.

There may be several advantages associated with performing the access control at the source if the source knows the CGI to CSG mapping. For example, the source may make the decision to handover the access terminal to the target even in the case where the access terminal's CSG list is out of date (e.g., the indication from the access terminal that it is allowed to access the cell may be considered redundant). As another example, for a hybrid access mode target, the source or network entity may inform the target whether the access terminal is a member of the CSG, so that the target may distinguish between members and non members of the CSG for the handover decision. As yet another example, if PCI confusion does not exist with regard to the target, the source may perform access control for an access terminal without requiring the access terminal to read the CSG or report the CGI. This may result in a further reduction in the handover latency. Also, source-based access control enables access control for an X2 handover if the CSG is in a macro eNB.

Referring now to FIG. 4, as represented by blocks 402 and 404, at some point in time an access terminal sends a measurement report to the source and the source determines the CSG ID and access mode of the target. These operations may be similar to the operations described above at blocks 202 and 204.

Based on this target information and a CSG list (e.g., an allowed CSG list) of the access terminal, the source may perform access control for the handover. For example, as represented by block 406, the source may determine whether the access terminal is a member of a CSG associated with the target.

As represented by block 408, the source determines whether to include an indication of whether the access terminal is a member of the CSG of the target in a handover message to be sent to the network entity. For example, in the event the access mode indicates that the target is a hybrid cell, the source includes this indication in the handover message. In contrast, if the access mode indicates that the target has closed access (e.g., where the handover message is sent only if access is allowed), the source may elect to not include such an indication in the handover message.

As represented by block 410, the source then sends the handover message to the network entity to initiate the handover. This handover message may include, for example, the CSG ID, access mode, and CGI of the target.

The handover message sent at block 410 may take various forms in different implementations. For example, in an LTE system the source may send a Handover Required message to the target, while in a UMTS system the source may send a Relocation Required message to the MSC/SGSN.

As represented by block 412 of FIG. 5, upon receipt of this handover message from the source, the network entity sends a handover message to the target. If the target is a hybrid cell, this handover message may include an indication of whether the access terminal is a member of the CSG of the target. In addition, this handover message may include, for example, the CSG ID, access mode, and CGI of the target.

Also, in some implementations, if the handover message received by the network entity includes the CSG ID and access mode of the target, the network entity may optionally perform access control (e.g., a membership check).

The handover message sent at block 412 may take various forms in different implementations. For example, in an LTE system the network entity may send a Handover Request message to the target, while in a UMTS system the source may send a Relocation Request message to the MSC/SGSN.

As represented by block 414, upon receipt of this message, the target may perform access control for the handover. For example, if the target is a hybrid cell, the target cell may use the indication of whether the access terminal is a member of the CSG in determining whether to accept the handover and/or how to allocate resources. The target may then send a handover acknowledgement message (e.g., a handover request acknowledgement message or a relocation request acknowledgement message) to the network entity. Then, as represented by block 416, the network entity may send a handover message (e.g., a handover command or a relocation command) to the source. Thus, the operations of blocks 414 and 416 may be similar to the operations of blocks 218 and 220 discussed above.

Figure 6:
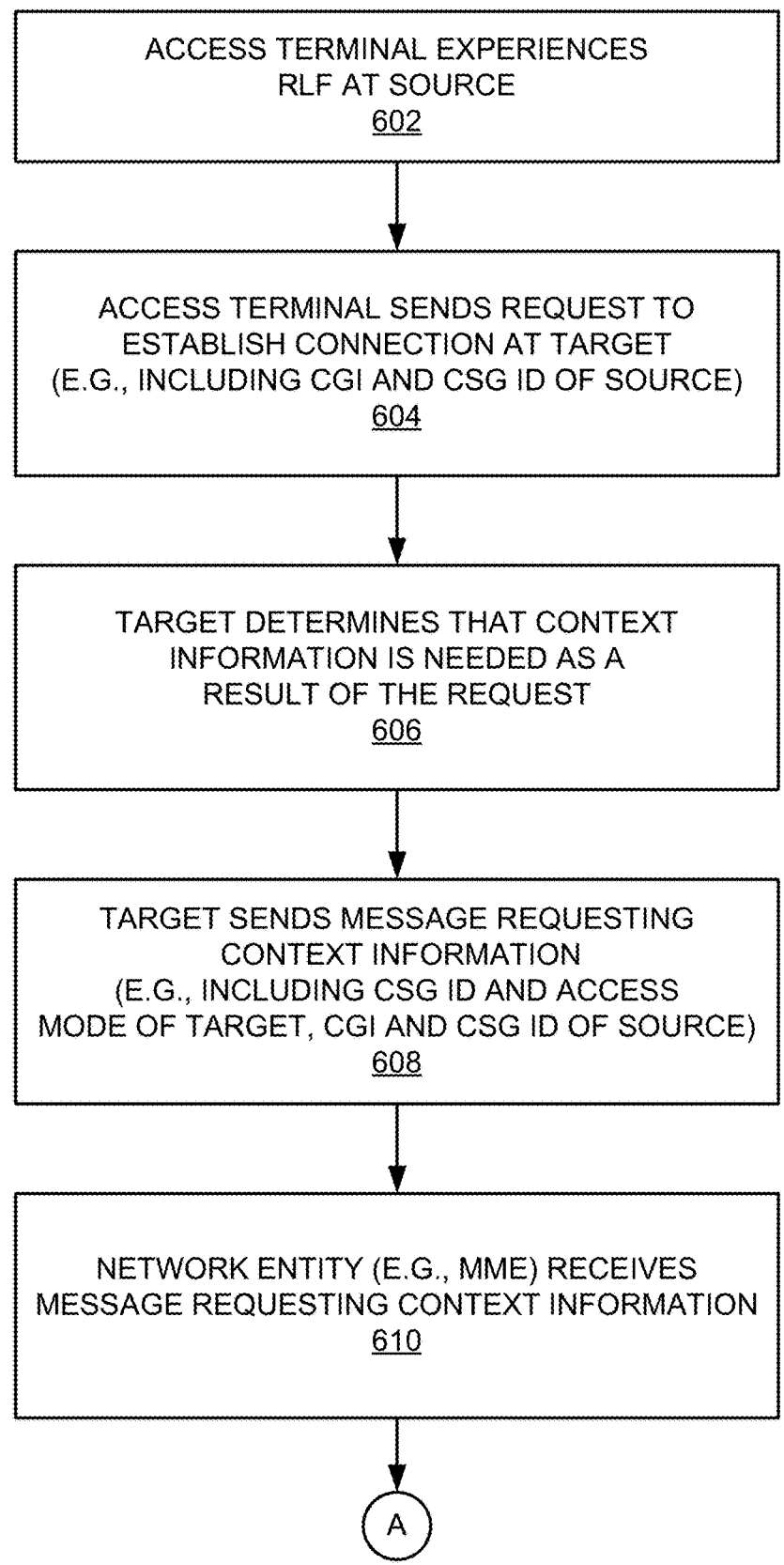
FIGS. 6 and 7 are a flowchart of several sample aspects of operations that may be performed in conjunction with providing a membership check at a network entity after an access terminal experiences RLF.
Figure 7:
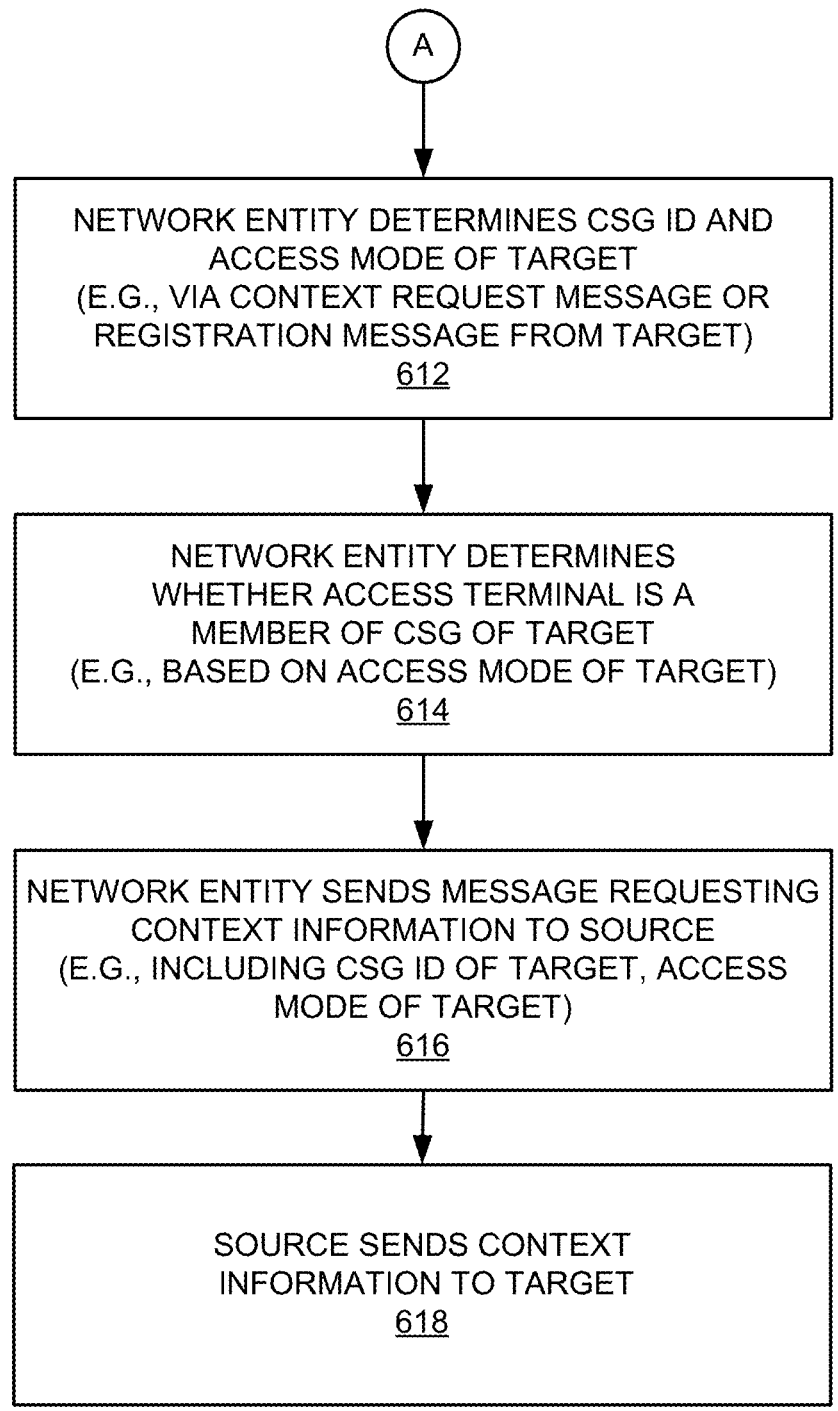
Figure 8:
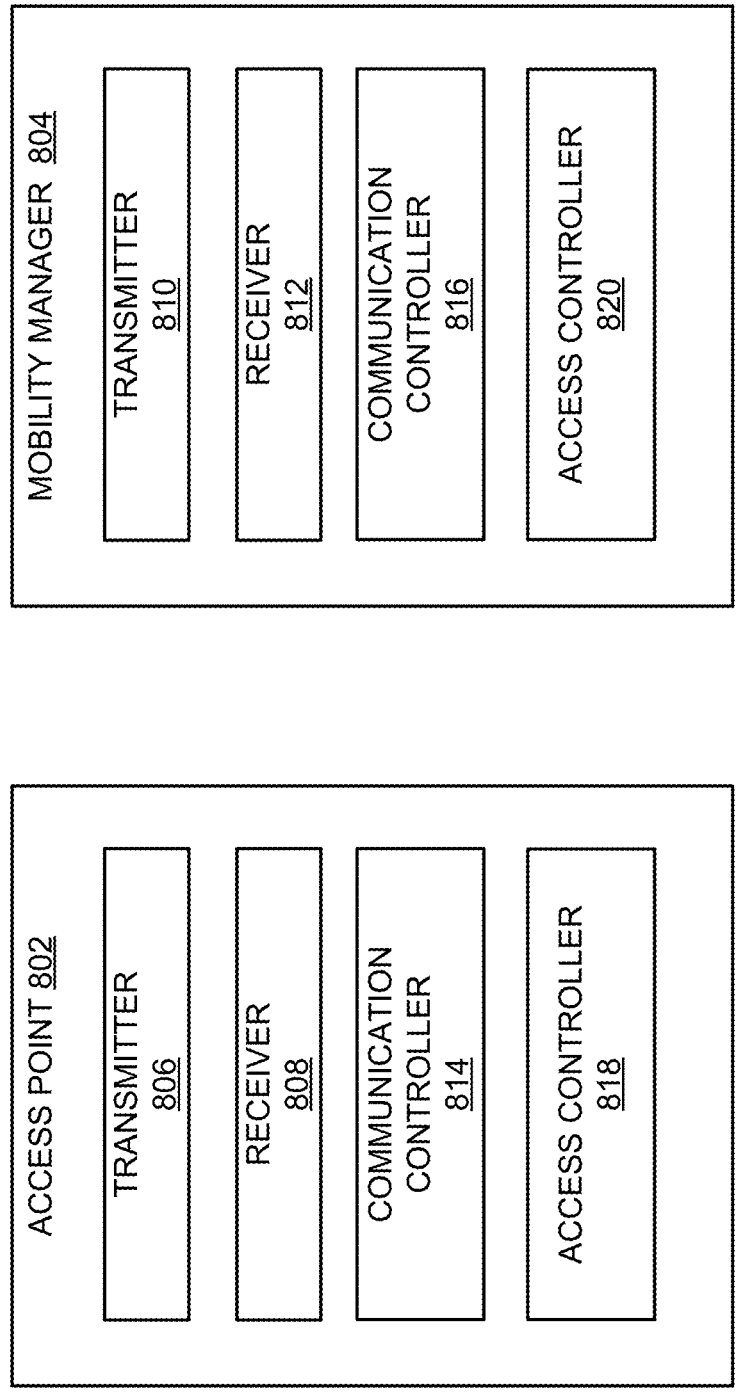
FIG. 8 is a simplified block diagram of several sample aspects of components that may be employed in communication nodes.

The flowchart of FIGS. 6 and 7 illustrates operations that may be performed in conjunction with a network entity performing access control as taught herein after an access terminal experiences RLF. Here, a context fetch may be initiated by a cell when the access terminal attempts to establish a connection at the cell after experiencing RLF at another cell. In some cases, when an access terminal accesses a target during RLF, the access terminal may report an identity that is recognizable by the network entity (e.g., MME). For example, the access terminal may report an identifier such as TIMSI or IMSI.

Referring initially to FIG. 6, as represented by block 602, at some point in time an access terminal may experience RLF at a given cell (hereafter referred to as the source, for convenience). As a result of this RLF condition, the access terminal may attempt to connect to a different cell (hereafter referred to as the target, for convenience). Here, the access terminal may identify a potential target and read the information broadcast by that target (e.g., system information blocks (SIBs)) to determine if the access terminal is allowed to access the target. For example, if the target is a closed access mode CSG cell, the access terminal may compare the CSG ID advertised by the target with the CSGs in the allowed CSG list of the access terminal. If allowed, the access terminal may then attempt to access the target.

As represented by block 604, the access terminal may thus send a request to establish a connection to the target. This request may include, for example, the PCI, CGI and CSG ID of the source. In addition, the request may include an identifier of the access terminal (e.g., as discussed above).

As represented by block 606, as a result of the request, the target may determine that it needs to acquire context information associated with the access terminal. Accordingly, as represented by block 608, the target may send a message requesting the context information (e.g., a context fetch message). This message may include, for example, the CGI, CSG ID, and access mode of the target, along with the CGI and CSG ID of the source. In addition, this message may include an identifier of the access terminal.

As represented by block 610, a network entity (e.g., a mobility manager) may receive the message sent at block 608. As represented by block 612 of FIG. 7, the network entity may determine the CSG ID and access mode of the target. For example, the network entity may receive this information from the target via the message received at block 610 or via some other message (e.g., a registration message).

As represented by block 614, the network entity may perform access control based on the received information. For example, if the target is a hybrid cell, the network entity may perform a membership check by determining whether the access terminal is a member of the CSG of the target. If the access control indicates that the access terminal is not allowed to access the target, the network entity may send an error message to the target.

As represented by block 616, if the access control indicates that the access terminal is allowed to access the target, the network entity sends a message requesting the context information (e.g., forwards the context fetch) to the source. Here, the network entity may identify the source based on, for example, the CGI of the source obtained by the network entity as discussed above. The message sent at block 616 may include, for example, the CGI, CSG ID, and access mode of the target.

As represented by block 618, upon receipt of the message from the network entity requesting the context information, the source sends the context information to the target. For example, the source may initiate handover of the access terminal to the target, whereby operations such as those described above at blocks 204-220 may be performed.

In an alternative implementation (e.g., where the source is able to acquire the CSG list of the access terminal), the source may perform access control for handover to a cell during an RLF event. Here, if RLF occurs, the access terminal identifies a target and reads the target broadcast information (e.g., SIBs) to determine if the access terminal is allowed to access the target. For example, if the target is a closed access mode CSG cell, the access terminal may compare the CSG ID advertised by the target with the CSGs in the CSG list of the access terminal. If allowed, the access terminal accesses the target cell and indicates the PCI of the source and an access terminal identifier, and optionally the CGI of the source. The target then sends a context fetch message to the source including the CSG ID, access mode, and CGI of the target cell. Alternatively, a context fetch message may be sent to the source as described above at blocks 608-616. Upon receipt of the message requesting the context information, the source sends the context information to the target. For example, the source may initiate handover of the access terminal to the target, whereby operations such as those described above at blocks 404-416 may be performed.

FIG. 8 illustrates several sample components that may be incorporated into nodes such as an access point 802 and a mobility manager 804 to perform access control operations as taught herein. The described components also may be incorporated into other nodes in a communication system. For example, other nodes in a system may include components similar to those described for the access point 802 and the mobility manager 804 to provide similar functionality. A given node may contain one or more of the described components. For example, an access point may contain multiple transmitter and receiver components that enable the access point to communicate via different technologies.

As shown in FIG. 8, the access point 802 and the mobility manager 804 include transmitters and receivers for communicating with other nodes (e.g., via wire-based links or wireless links). The access point 802 includes a transmitter 806 for sending signals (e.g., messages) and a receiver 808 for receiving signals. Similarly, the mobility manager 804 includes a transmitter 810 for sending signals and a receiver 812 for receiving signals.

The access point 802 and the mobility manager 804 also include other components that may be used in conjunction with access control operations as taught herein. For example, the access point 802 and the mobility manager 804 may include communication controllers 814 and 816, respectively, for managing communication with other nodes (e.g., formatting and processing messages/indications) and for providing other related functionality as taught herein. In addition, the access point 802 and the mobility manager 804 may include access controllers 818 and 820, respectively, for performing access control-related operations (e.g., determining whether an access terminal is a member of a CSG, determining a CSG ID, determining a CSG associated with a cell, determining an access mode of a cell, determining whether to include an indication in a message, determining an access terminal identifier, determining that context information is needed) and for providing other related functionality as taught herein.

In some implementations the components of FIG. 8 may be implemented in one or more processors (e.g., that uses and/or incorporates data memory for storing information or code used by the processor(s) to provide this functionality). For example, the functionality of blocks 814 and 818 may be implemented by a processor or processors of an access point and data memory of the access point (e.g., by execution of appropriate code and/or by appropriate configuration of processor components). Similarly, the functionality of blocks 816 and 820 may be implemented by a processor or processors of a mobility manager and data memory of the mobility manager (e.g., by execution of appropriate code and/or by appropriate configuration of processor components).

The teachings herein may be employed in a network that includes macro scale coverage (e.g., a large area cellular network such as a 3G network, typically referred to as a macro cell network or a WAN) and smaller scale coverage (e.g., a residence-based or building-based network environment, typically referred to as a LAN). As an access terminal (AT) moves through such a network, the access terminal may be served in certain locations by access points that provide macro coverage while the access terminal may be served at other locations by access points that provide smaller scale coverage. In some aspects, the smaller coverage nodes may be used to provide incremental capacity growth, in-building coverage, and different services (e.g., for a more robust user experience).

A node (e.g., an access point) that provides coverage over a relatively large area may be referred to as a macro access point while a node that provides coverage over a relatively small area (e.g., a residence) may be referred to as a femto access point. It should be appreciated that the teachings herein may be applicable to nodes associated with other types of coverage areas. For example, a pico access point may provide coverage (e.g., coverage within a commercial building) over an area that is smaller than a macro area and larger than a femto area. In various applications, other terminology may be used to reference a macro access point, a femto access point, or other access point-type nodes. For example, a macro access point may be configured or referred to as an access node, base station, access point, eNodeB, macro cell, and so on. Also, a femto access point may be configured or referred to as a Home NodeB, Home eNodeB, access point base station, femto cell, and so on. In some implementations, a node may be associated with (e.g., referred to as or divided into) one or more cells or sectors. A cell or sector associated with a macro access point, a femto access point, or a pico access point may be referred to as a macro cell, a femto cell, or a pico cell, respectively.

Figure 9:
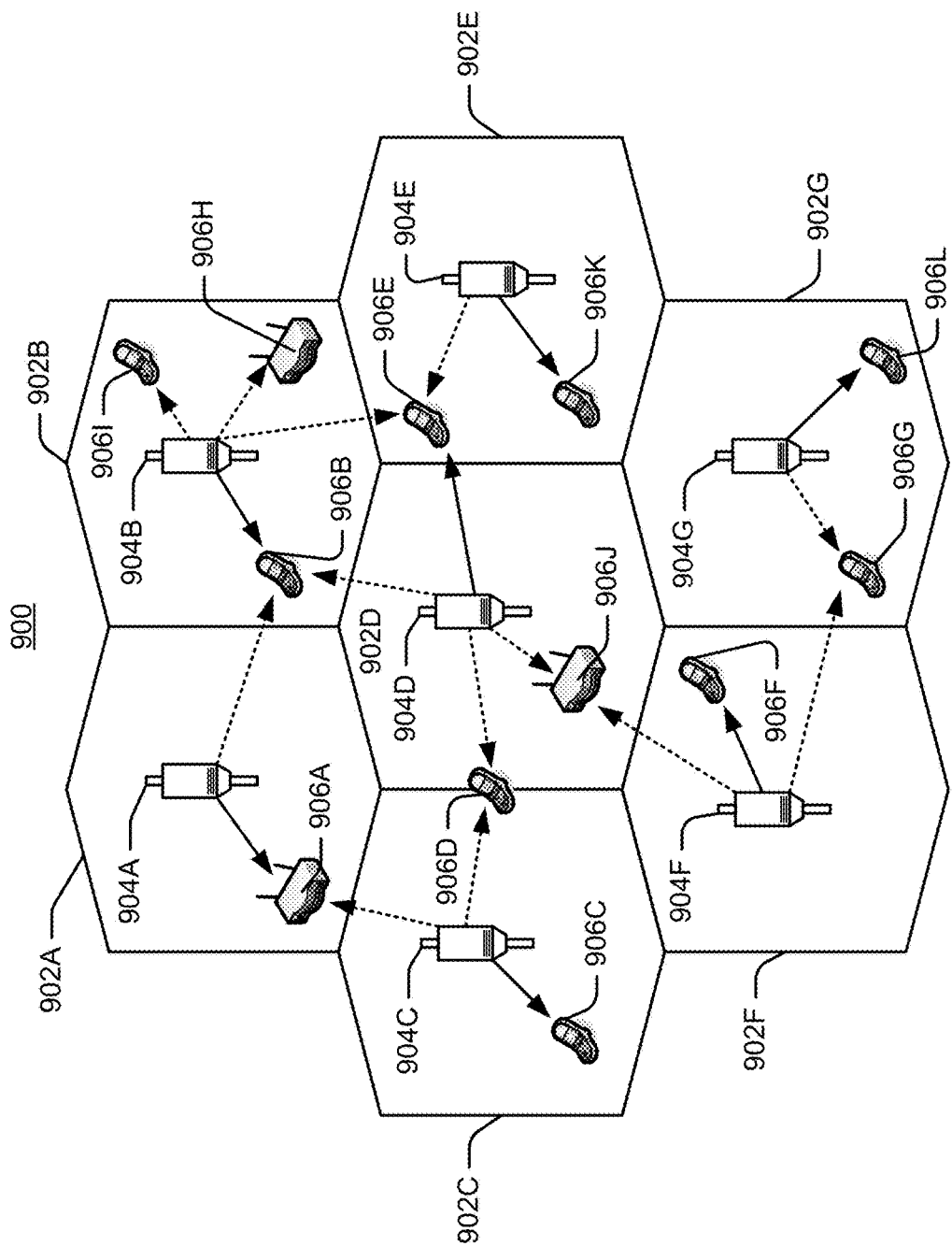
FIG. 9 is a simplified diagram of a wireless communication system.

FIG. 9 illustrates a wireless communication system 900, configured to support a number of users, in which the teachings herein may be implemented. The system 900 provides communication for multiple cells 902, such as, for example, macro cells 902A-902G, with each cell being serviced by a corresponding access point 904 (e.g., access points 904A-904G). As shown in FIG. 9, access terminals 906 (e.g., access terminals 906A-906L) may be dispersed at various locations throughout the system over time. Each access terminal 906 may communicate with one or more access points 904 on a forward link (FL) and/or a reverse link (RL) at a given moment, depending upon whether the access terminal 906 is active and whether it is in soft handoff, for example. The wireless communication system 900 may provide service over a large geographic region. For example, macro cells 902A-902G may cover a few blocks in a neighborhood or several miles in rural environment.

Figure 10:
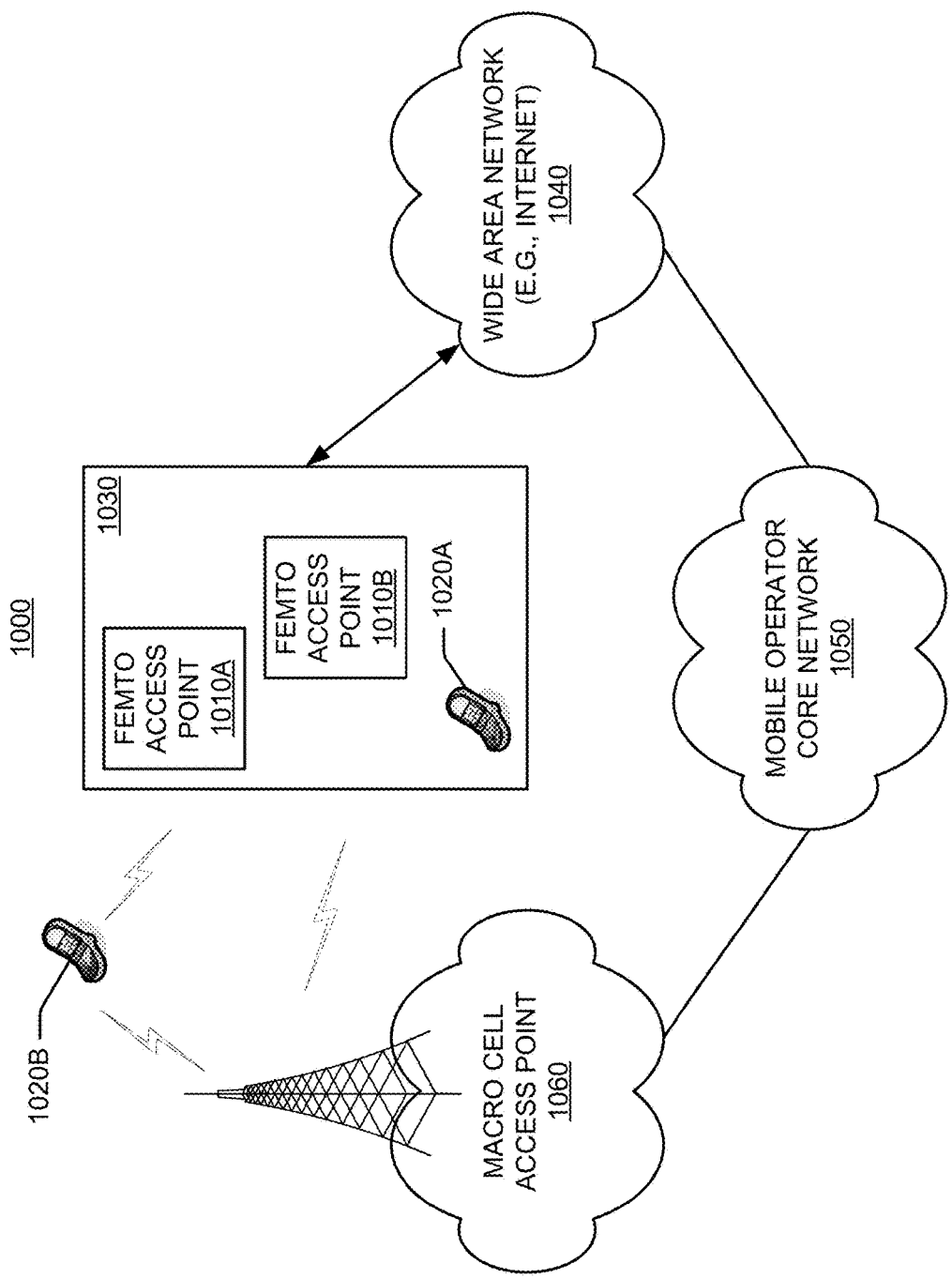
FIG. 10 is a simplified diagram of a wireless communication system including femto nodes.

FIG. 10 illustrates an exemplary communication system 1000 where one or more femto access points are deployed within a network environment. Specifically, the system 1000 includes multiple femto access points 1010 (e.g., femto access points 1010A and 1010B) installed in a relatively small scale network environment (e.g., in one or more user residences 1030). Each femto access point 1010 may be coupled to a wide area network 1040 (e.g., the Internet) and a mobile operator core network 1050 via a DSL router, a cable modem, a wireless link, or other connectivity means (not shown). As will be discussed below, each femto access point 1010 may be configured to serve associated access terminals 1020 (e.g., access terminal 1020A) and, optionally, other (e.g., hybrid or alien) access terminals 1020 (e.g., access terminal 1020B). In other words, access to femto access points 1010 may be restricted whereby a given access terminal 1020 may be served by a set of designated (e.g., home) femto access point(s) 1010 but may not be served by any non-designated femto access points 1010 (e.g., a neighbor's femto access point 1010).

Figure 11:
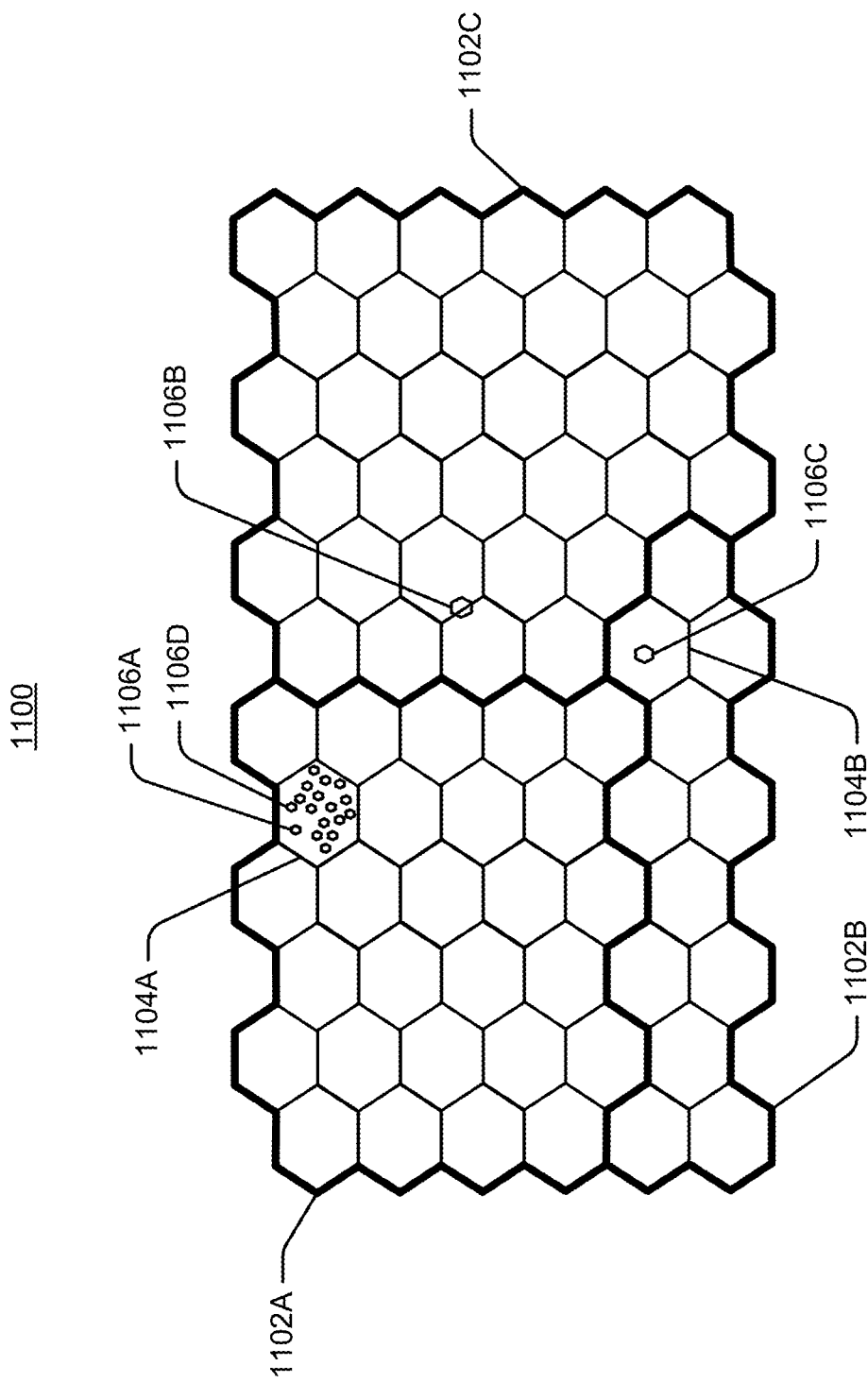
FIG. 11 is a simplified diagram illustrating coverage areas for wireless communication.

FIG. 11 illustrates an example of a coverage map 1100 where several tracking areas 1102 (or routing areas or location areas) are defined, each of which includes several macro coverage areas 1104. Here, areas of coverage associated with tracking areas 1102A, 1102B, and 1102C are delineated by the wide lines and the macro coverage areas 1104 are represented by the larger hexagons. The tracking areas 1102 also include femto coverage areas 1106. In this example, each of the femto coverage areas 1106 (e.g., femto coverage areas 1106B and 1106C) is depicted within one or more macro coverage areas 1104 (e.g., macro coverage areas 1104A and 1104B). It should be appreciated, however, that some or all of a femto coverage area 1106 may not lie within a macro coverage area 1104. In practice, a large number of femto coverage areas 1106 (e.g., femto coverage areas 1106A and 1106D) may be defined within a given tracking area 1102 or macro coverage area 1104. Also, one or more pico coverage areas (not shown) may be defined within a given tracking area 1102 or macro coverage area 1104.

Referring again to FIG. 10, the owner of a femto access point 1010 may subscribe to mobile service, such as, for example, 3G mobile service, offered through the mobile operator core network 1050. In addition, an access terminal 1020 may be capable of operating both in macro environments and in smaller scale (e.g., residential) network environments. In other words, depending on the current location of the access terminal 1020, the access terminal 1020 may be served by a macro cell access point 1060 associated with the mobile operator core network 1050 or by any one of a set of femto access points 1010 (e.g., the femto access points 1010A and 1010B that reside within a corresponding user residence 1030). For example, when a subscriber is outside his home, he is served by a standard macro access point (e.g., access point 1060) and when the subscriber is at home, he is served by a femto access point (e.g., access point 1010A). Here, a femto access point 1010 may be backward compatible with legacy access terminals 1020.

A femto access point 1010 may be deployed on a single frequency or, in the alternative, on multiple frequencies. Depending on the particular configuration, the single frequency or one or more of the multiple frequencies may overlap with one or more frequencies used by a macro access point (e.g., access point 1060).

In some aspects, an access terminal 1020 may be configured to connect to a preferred femto access point (e.g., the home femto access point of the access terminal 1020) whenever such connectivity is possible. For example, whenever the access terminal 1020A is within the user's residence 1030, it may be desired that the access terminal 1020A communicate only with the home femto access point 1010A or 1010B.

In some aspects, if the access terminal 1020 operates within the macro cellular network 1050 but is not residing on its most preferred network (e.g., as defined in a preferred roaming list), the access terminal 1020 may continue to search for the most preferred network (e.g., the preferred femto access point 1010) using a better system reselection (BSR) procedure, which may involve a periodic scanning of available systems to determine whether better systems are currently available and subsequently acquire such preferred systems. The access terminal 1020 may limit the search for specific band and channel. For example, one or more femto channels may be defined whereby all femto access points (or all restricted femto access points) in a region operate on the femto channel(s). The search for the most preferred system may be repeated periodically. Upon discovery of a preferred femto access point 1010, the access terminal 1020 selects the femto access point 1010 and registers on it for use when within its coverage area.

Access to a femto access point may be restricted in some aspects. For example, a given femto access point may only provide certain services to certain access terminals. In deployments with so-called restricted (or closed) access, a given access terminal may only be served by the macro cell mobile network and a defined set of femto access points (e.g., the femto access points 1010 that reside within the corresponding user residence 1030). In some implementations, an access point may be restricted to not provide, for at least one node (e.g., access terminal), at least one of: signaling, data access, registration, paging, or service.

In some aspects, a restricted femto access point (which may also be referred to as a Closed Subscriber Group Home NodeB) is one that provides service to a restricted provisioned set of access terminals. This set may be temporarily or permanently extended as necessary. In some aspects, a Closed Subscriber Group (CSG) may be defined as the set of access points (e.g., femto access points) that share a common access control list of access terminals.

Various relationships may thus exist between a given femto access point and a given access terminal. For example, from the perspective of an access terminal, an open femto access point may refer to a femto access point with unrestricted access (e.g., the femto access point allows access to any access terminal). A restricted femto access point may refer to a femto access point that is restricted in some manner (e.g., restricted for access and/or registration). A home femto access point may refer to a femto access point on which the access terminal is authorized to access and operate on (e.g., permanent access is provided for a defined set of one or more access terminals). A hybrid (or guest) femto access point may refer to a femto access point on which different access terminals are provided different levels of service (e.g., some access terminals may be allowed partial and/or temporary access while other access terminals may be allowed full access). An alien femto access point may refer to a femto access point on which the access terminal is not authorized to access or operate on, except for perhaps emergency situations (e.g., 911 calls).

From a restricted femto access point perspective, a home access terminal may refer to an access terminal that is authorized to access the restricted femto access point installed in the residence of that access terminal's owner (usually the home access terminal has permanent access to that femto access point). A guest access terminal may refer to an access terminal with temporary access to the restricted femto access point (e.g., limited based on deadline, time of use, bytes, connection count, or some other criterion or criteria). An alien access terminal may refer to an access terminal that does not have permission to access the restricted femto access point, except for perhaps emergency situations, for example, such as 911 calls (e.g., an access terminal that does not have the credentials or permission to register with the restricted femto access point).

For convenience, the disclosure herein describes various functionality in the context of a femto access point. It should be appreciated, however, that a pico access point may provide the same or similar functionality for a larger coverage area. For example, a pico access point may be restricted, a home pico access point may be defined for a given access terminal, and so on.

The teachings herein may be employed in a wireless multiple-access communication system that simultaneously supports communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 12:
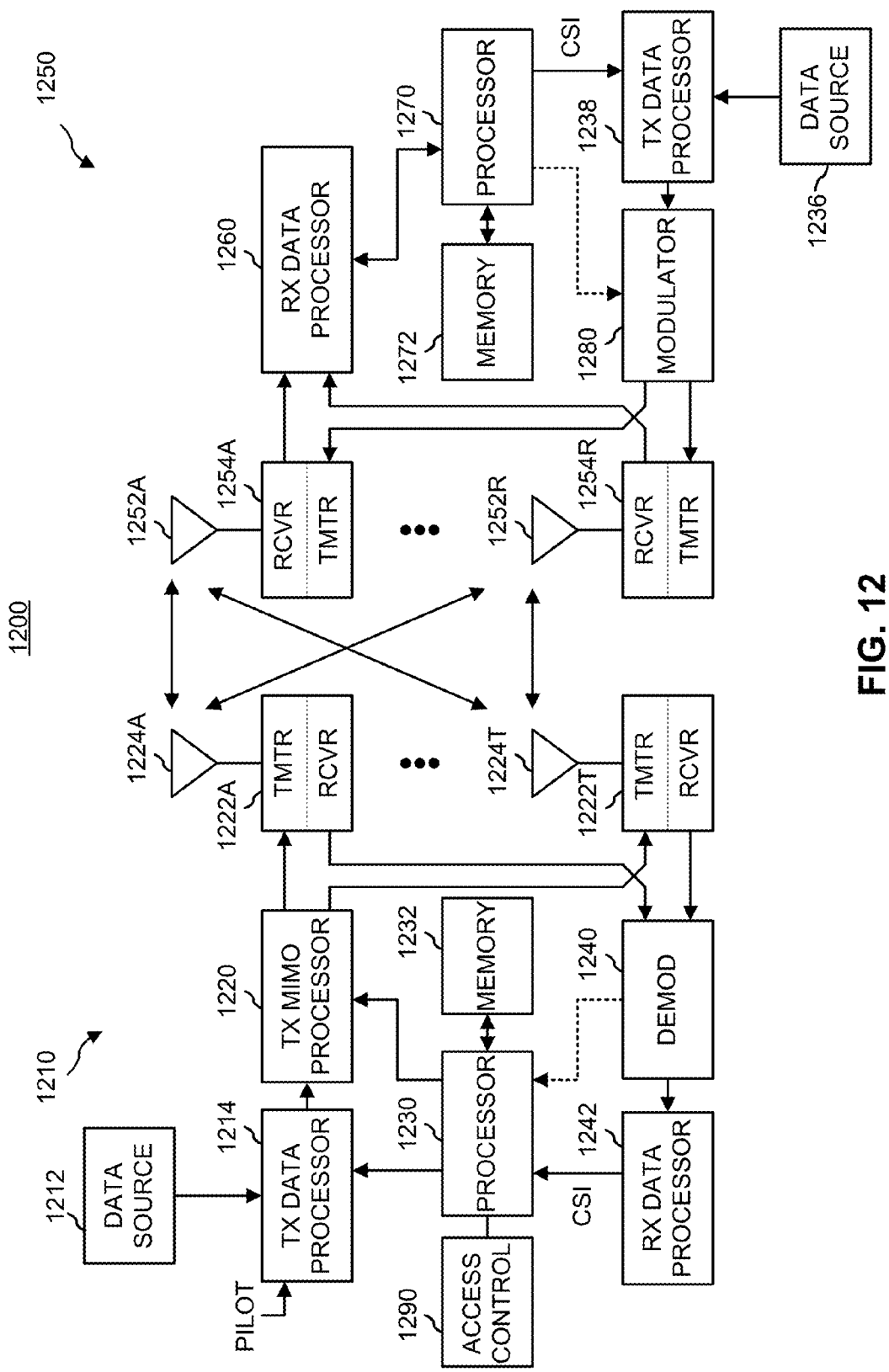
FIG. 12 is a simplified block diagram of several sample aspects of communication components.
Figure 13:
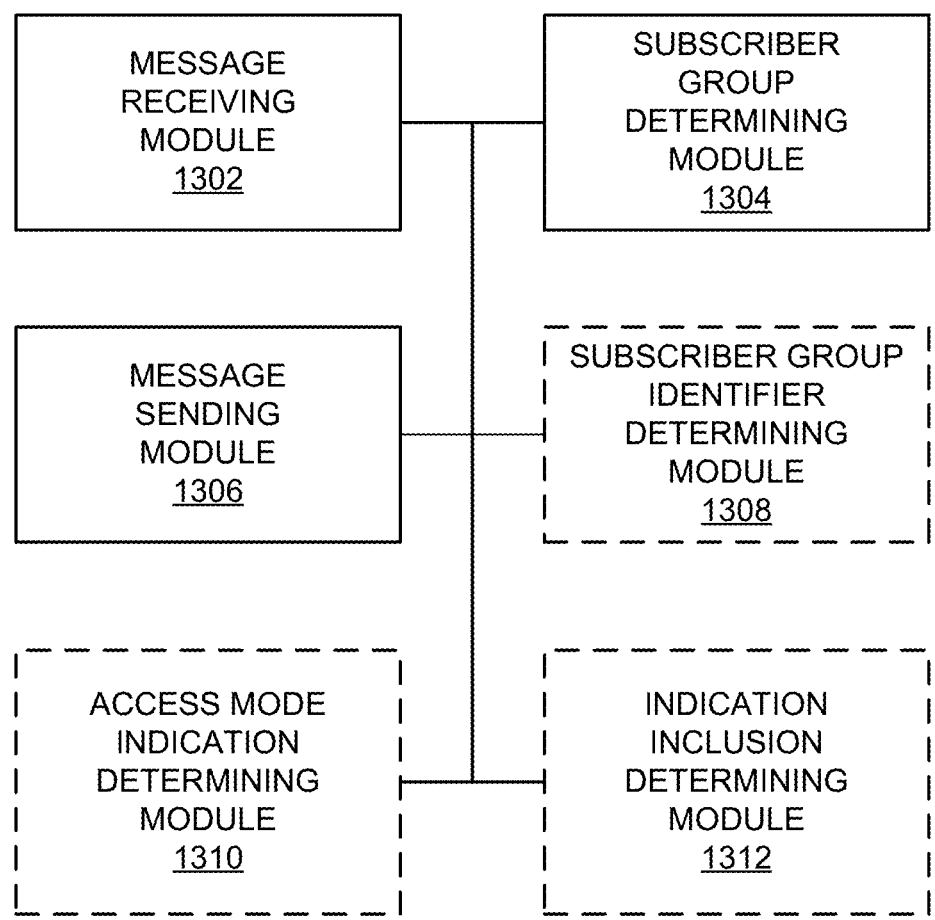
FIGS. 13-17 are simplified block diagrams of several sample aspects of apparatuses configured to provide access control as taught herein.
Figure 14:
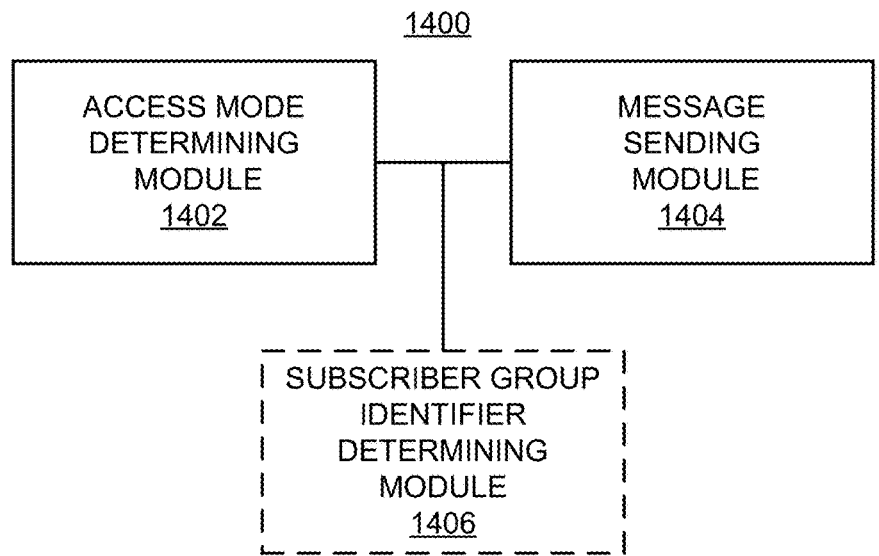
Figure 15:
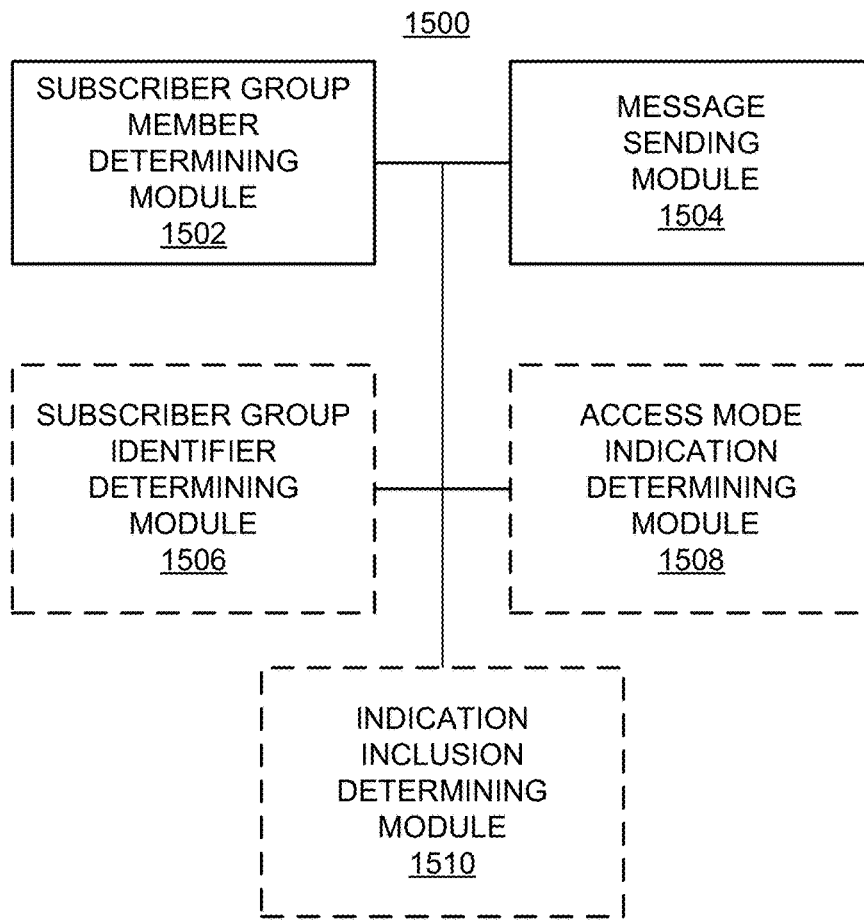
Figure 16:
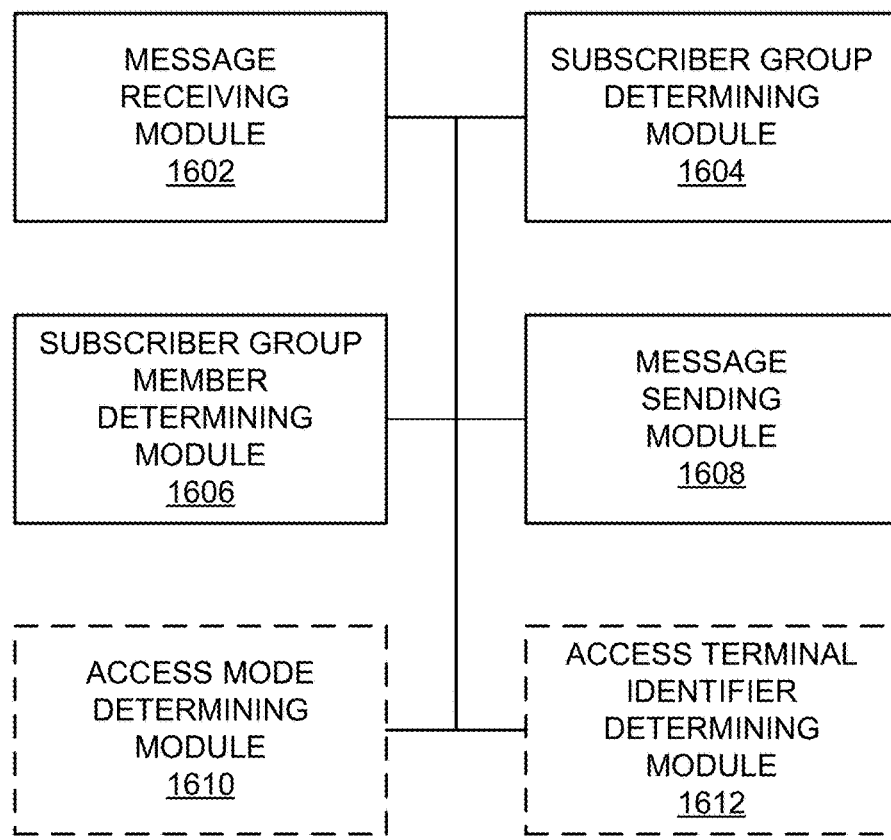
Figure 17:
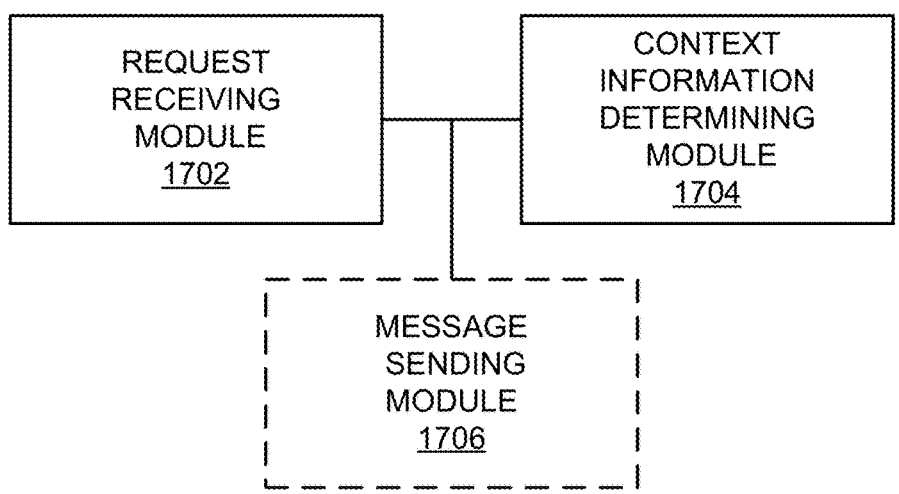

FIG. 12 illustrates a wireless device 1210 (e.g., an access point) and a wireless device 1250 (e.g., an access terminal) of a sample MIMO system 1200. At the device 1210, traffic data for a number of data streams is provided from a data source 1212 to a transmit (TX) data processor 1214. Each data stream may then be transmitted over a respective transmit antenna.

The TX data processor 1214 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1230. A data memory 1232 may store program code, data, and other information used by the processor 1230 or other components of the device 1210.

The modulation symbols for all data streams are then provided to a TX MIMO processor 1220, which may further process the modulation symbols (e.g., for OFDM). The TX MIMO processor 1220 then provides $N_T$ modulation symbol streams to $N_T$ transceivers (XCVR) 1222A through 1222T. In some aspects, the TX MIMO processor 1220 applies beam-forming weights to the symbols of the data streams and to the antenna from which the symbol is being transmitted.

Each transceiver 1222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1222A through 1222T are then transmitted from $N_T$ antennas 1224A through 1224T, respectively.

At the device 1250, the transmitted modulated signals are received by $N_R$ antennas 1252A through 1252R and the received signal from each antenna 1252 is provided to a respective transceiver (XCVR) 1254A through 1254R. Each transceiver 1254 conditions (e.g., filters, amplifies, and downconverts) a respective received signal, digitizes the conditioned signal to provide samples, and further processes the samples to provide a corresponding "received" symbol stream.

A receive (RX) data processor 1260 then receives and processes the $N_R$ received symbol streams from $N_R$ transceivers 1254 based on a particular receiver processing technique to provide $N_T$ "detected" symbol streams. The RX data processor 1260 then demodulates, deinterleaves, and decodes each detected symbol stream to recover the traffic data for the data stream. The processing by the RX data processor 1260 is complementary to that performed by the TX MIMO processor 1220 and the TX data processor 1214 at the device 1210.

A processor 1270 periodically determines which pre-coding matrix to use (discussed below). The processor 1270 formulates a reverse link message comprising a matrix index portion and a rank value portion. A data memory 1272 may store program code, data, and other information used by the processor 1270 or other components of the device 1250.

The reverse link message may comprise various types of information regarding the communication link and/or the received data stream. The reverse link message is then processed by a TX data processor 1238, which also receives traffic data for a number of data streams from a data source 1236, modulated by a modulator 1280, conditioned by the transceivers 1254A through 1254R, and transmitted back to the device 1210.

At the device 1210, the modulated signals from the device 1250 are received by the antennas 1224, conditioned by the transceivers 1222, demodulated by a demodulator (DEMOD) 1240, and processed by a RX data processor 1242 to extract the reverse link message transmitted by the device 1250. The processor 1230 then determines which pre-coding matrix to use for determining the beam-forming weights then processes the extracted message.

FIG. 12 also illustrates that the communication components may include one or more components that perform access control operations as taught herein. For example, an access control component 1290 may cooperate with the processor 1230 and/or other components of the device 1210 to control access by another device (e.g., device 1250) as taught herein. It should be appreciated that for each device 1210 and 1250 the functionality of two or more of the described components may be provided by a single component. For example, a single processing component may provide the functionality of the access control component 1290 and the processor 1230.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure may be described using 3GPP terminology, it is to be understood that the teachings herein may be applied to 3GPP (e.g., Re199, Re15, Re16, Re17) technology, as well as 3GPP2 (e.g., 1xRTT, 1xEV-DO RelO, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

The functionality described herein (e.g., with regard to one or more of the accompanying figures) may correspond in some aspects to similarly designated "means for" functionality in the appended claims. Referring to FIGS. 13-17, apparatuses 1300, 1400, 1500, 1600, and 1700 are represented as a series of interrelated functional modules. Here, a message receiving module 1302 may correspond at least in some aspects to, for example, a receiver as discussed herein. A subscriber group determining module 1304 may correspond at least in some aspects to, for example, an access controller as discussed herein. A message sending module 1306 may correspond at least in some aspects to, for example, a transmitter as discussed herein. A subscriber group identifier determining module 1308 may correspond at least in some aspects to, for example, an access controller as discussed herein. An access mode indication determining module 1310 may correspond at least in some aspects to, for example, an access controller as discussed herein. An indication inclusion determining module 1312 may correspond at least in some aspects to, for example, an access controller as discussed herein. An access mode determining module 1402 may correspond at least in some aspects to, for example, an access controller as discussed herein. A message sending module 1404 may correspond at least in some aspects to, for example, a transmitter as discussed herein. A subscriber group identifier determining module 1406 may correspond at least in some aspects to, for example, an access controller as discussed herein. A subscriber group member determining module 1502 may correspond at least in some aspects to, for example, an access controller as discussed herein. A message sending module 1504 may correspond at least in some aspects to, for example, a transmitter as discussed herein. A subscriber group identifier determining module 1506 may correspond at least in some aspects to, for example, an access controller as discussed herein. An access mode indication determining module 1508 may correspond at least in some aspects to, for example, an access controller as discussed herein. An indication inclusion determining module 1510 may correspond at least in some aspects to, for example, an access controller as discussed herein. A message receiving module 1602 may correspond at least in some aspects to, for example, a receiver as discussed herein. A subscriber group determining module 1604 may correspond at least in some aspects to, for example, an access controller as discussed herein. A subscriber group member determining module 1606 may correspond at least in some aspects to, for example, an access controller as discussed herein. A message sending module 1608 may correspond at least in some aspects to, for example, a transmitter as discussed herein. An access mode determining module 1610 may correspond at least in some aspects to, for example, an access controller as discussed herein. An access terminal identifier determining module 1612 may correspond at least in some aspects to, for example, an access controller as discussed herein. A request receiving module 1702 may correspond at least in some aspects to, for example, a receiver as discussed herein. A context information determining module 1704 may correspond at least in some aspects to, for example, an access controller as discussed herein. A message sending module 1706 may correspond at least in some aspects to, for example, a transmitter as discussed herein.

The functionality of the modules of FIGS. 13-17 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein. In some aspects one or more of any dashed blocks in FIGS. 13-17 are optional.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit (IC), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. It should be appreciated that a computer-readable medium may be implemented in any suitable computer-program product.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of communication at a wireless device, comprising:
   determining that an access terminal is a member of a subscriber group associated with a cell;
   determining an access mode of the cell;
   preparing a message comprising an indication that the access terminal is a member of the subscriber group associated with the cell based at least in part on determining the access mode of the cell; and
   sending the message to initiate handover of the access terminal to the cell.

2. The method of claim 1, further comprising:
   determining a subscriber group identity of the cell based at least in part on information provided by the cell, and
   wherein determining that the access terminal is a member of the subscriber group associated with the cell is based at least in part on the subscriber group identity.

3. The method of claim 2, wherein the subscriber group identity is determined via signaling from the cell.

4. The method of claim 3, wherein the signaling is received from the cell over an X2 interface.

5. The method of claim 3, wherein the subscriber group identity is determined via neighbor relations.

6. The method of claim 2, wherein the subscriber group identity comprises a closed subscriber group identifier (CSG ID).

7. The method of claim 2, wherein the subscriber group identity is determined based at least in part on at least one of: a cell global identifier (CGI) of the cell; a physical cell identifier (PCI) of the cell; or an operations, administration, and maintenance (OAM) configuration; or any combination thereof.

8. The method of claim 1, wherein the determination that the access terminal is a member of the subscriber group is based at least in part on a subscriber group list associated with the access terminal.

9. The method of claim 8, further comprising:
   determining an identifier of the subscriber group associated with the cell, wherein the determination that the access terminal is a member of the subscriber group is based at least in part on a determination that the subscriber group list includes the identifier of the subscriber group.

10. The method of claim 9, wherein the determination of the identifier of the subscriber group is based at least in part on information received from the access terminal.

11. The method of claim 10, wherein determining the access mode of the cell comprises:
    determining that the access mode of the cell is a hybrid access mode, wherein the determination to include the indication is based at least in part on a determination that the access mode of the cell is the hybrid access mode.

12. The method of claim 1, wherein the determination of the access mode of the cell is based at least in part on an indication of the access mode from the access terminal.

13. The method of claim 1, wherein the determination of the access mode of the cell is based at least in part on a cell global identifier of the cell.

14. The method of claim 1, wherein determining the access mode of the cell comprises:
    obtaining an indication of the access mode over an X2 interface.

15. The method of claim 1, further comprising:
    determining to include the indication that the access terminal is a member of the subscriber group associated with the cell in the message based at least in part on the determination of the access mode of the cell.

16. An apparatus for wireless communication at a wireless device, comprising:
    means for determining that an access terminal is a member of a subscriber group associated with a cell;
    means for determining an access mode of the cell;
    means for preparing a message comprising an indication that the access terminal is a member of the subscriber group associated with the cell based at least in part on determining the access mode of the cell; and
    means for sending the message to initiate handover of the access terminal to the cell.

17. The apparatus of claim 16, further comprising:
    means for determining a subscriber group identity of the cell based at least in part on information provided by the cell, and
    wherein the means for determining that the access terminal is a member of the subscriber group associated with the cell is operable based at least in part on the subscriber group identity.

18. The apparatus of claim 17, wherein the means for determining the subscriber group identity is operable in response to signaling received from the cell.

19. The apparatus of claim 18, wherein the signaling comprises signaling received from the cell over an X2 interface.

20. The apparatus of claim 18, wherein the means for determining the subscriber group identity is operable to determinet the subscriber group identity based at least in part on neighbor relations.

21. The apparatus of claim 17, wherein the subscriber group identity comprises a closed subscriber group identifier (CSG ID).

22. The apparatus of claim 17, wherein the means for determining the subscriber group identity is operable to determine the subscriber group identity based at least in part on at least one of: a cell global identifier (CGI) of the cell; a physical cell identifier (PCI) of the cell; or an operations, administration, and maintenance (OAM) configuration; or any combination thereof.

23. The apparatus of claim 16, wherein the means for determining that the access terminal is a member of the subscriber group is operable based at least in part on a subscriber group list associated with the access terminal.

24. The apparatus of claim 23, further comprising:
    means for determining an identifier of the subscriber group associated with the cell, wherein the means for determining that the access terminal is a member of the subscriber group is operable based at least in part on the subscriber group list including the identifier of the subscriber group.

25. An apparatus for communication at a wireless device, comprising:
    a processor;
    memory in electronic communication with the processor; and instructions stored in the memory and operable, when executed by the processor, to cause the apparatus to:
determine that an access terminal is a member of a subscriber group associated with a cell;
determine an access mode of the cell;
prepare a message comprising an indication that the access terminal is a member of the subscriber group associated with the cell based at least in part on determining the access mode of the cell; and
send the message to initiate handover of the access terminal to the cell.

26. The apparatus of claim 25, the instructions being operable to cause the apparatus to:
determine a subscriber group identity of the cell based at least in part on information provided by the cell, and
determine that the access terminal is a member of the subscriber group associated with the cell based at least in part on the subscriber group identity.

27. The apparatus of claim 26, the instructions being operable to cause the apparatus to:
determine the subscriber group identity in response to signaling from the cell.

28. The apparatus of claim 27, wherein the signaling comprises signaling received from the cell over an X2 interface.

29. The apparatus of claim 27, the instructions being operable to cause the apparatus to:
determine the subscriber group identity based at least in part on neighbor relations.

30. The apparatus of claim 26, wherein the subscriber group identity comprises a closed subscriber group identifier (CSG ID).

31. The apparatus of claim 26, the instructions being operable to cause the apparatus to:
determine the subscriber group identity based at least in part on at least one of: a cell global identifier (CGI) of the cell; a physical cell identifier (PCI) of the cell; or an operations, administration, and maintenance (OAM) configuration; or any combination thereof.

32. The apparatus of claim 25, the instructions being operable to cause the apparatus to:
determine that the access terminal is a member of the subscriber group based at least in part on a subscriber group list associated with the access terminal.

33. The apparatus of claim 32, the instructions being operable to cause the apparatus to:
determine an identifier of the subscriber group associated with the cell, and
determine that the access terminal is a member of the subscriber group based at least in part on a determination that the subscriber group list includes the identifier of the subscriber group.

34. The apparatus of claim 33, wherein the instructions operable to cause the apparatus to determine the identifier of the subscriber group are operable based at least in part on information received from the access terminal.

35. The apparatus of claim 34, wherein the instructions operable to cause the apparatus to determine the access mode of the cell are further operable to cause the apparatus to:
determine that the access mode of the cell is a hybrid access mode, wherein the determination to include the indication is based at least in part on a determination that the access mode of the cell is the hybrid access mode.

36. The apparatus of claim 25, the instructions being operable to cause the apparatus to:
determine the access mode of the cell based at least in part on an indication of the access mode from the access terminal.

37. The apparatus of claim 25, the instructions operable to cause the apparatus to:
determine the access mode of the cell based at least in part on a cell global identifier of the cell.

38. The apparatus of claim 25, wherein the instructions operable to cause the apparatus to determine the access mode of the cell are further operable to cause the apparatus to:
obtain an indication of the access mode over an X2 interface.

39. The apparatus of claim 25, the instructions being operable to cause the apparatus to:
determine to include the indication that the access terminal is a member of the subscriber group associated with the cell in the message based at least in part on the determination of the access mode of the cell.

40. A non-transitory computer-readable medium storing code for communication, the code comprising instructions executable to:
determine that an access terminal is a member of a subscriber group associated with a cell;
determine an access mode of the cell;
prepare a message comprising an indication that the access terminal is a member of the subscriber group associated with the cell based at least in part on determining the access mode of the cell; and
send the message to initiate handover of the access terminal to the cell.

41. The non-transitory computer-readable medium of claim 40, wherein the instructions are executable to:
determine a subscriber group identity of the cell based at least in part on information provided by the cell, and
determine that the access terminal is a member of the subscriber group associated with the cell based at least in part on the subscriber group identity.

42. The non-transitory computer-readable medium of claim 41, the instructions being operable to cause the apparatus to:
determine the subscriber group identity based at least in part on signaling from the cell.

43. The non-transitory computer-readable medium of claim 42, wherein the signaling comprises signaling received from the cell over an X2 interface.

44. The non-transitory computer-readable medium of claim 42, wherein the instructions operable to cause the apparatus to determine the subscriber group identity are operable based at least in part on neighbor relations.

45. The non-transitory computer-readable medium of claim 41, wherein the subscriber group identity comprises a closed subscriber group identifier (CSG ID).

46. The non-transitory computer-readable medium of claim 41, the instructions operable to cause the apparatus to:
determine the subscriber group identity based at least in part on at least one of: a cell global identifier (CGI) of the cell; a physical cell identifier (PCI) of the cell; or an operations, administration, and maintenance (OAM) configuration; or any combination thereof.

* * * * *